(12) United States Patent
Masuda et al.

(10) Patent No.: US 11,984,260 B2
(45) Date of Patent: May 14, 2024

(54) ELECTRONIC DEVICE INCLUDING CHIP COMPONENT AND CASE

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Kosuke Yazawa, Tokyo (JP); Yoshiki Satou, Tokyo (JP); Katsumi Kobayashi, Tokyo (JP); Koji Utsui, Tokyo (JP); Koji Kaneko, Tokyo (JP)

(73) Assignee: TDK CORPORATION, Tokyo (JP)

( * ) Notice: Subject to any disclaimer, the term of this patent is extended or adjusted under 35 U.S.C. 154(b) by 308 days.

(21) Appl. No.: 17/133,102

(22) Filed: Dec. 23, 2020

(65) Prior Publication Data

US 2021/0225589 A1 Jul. 22, 2021

(30) Foreign Application Priority Data

Jan. 20, 2020 (JP) .................................. 2020-006957

(51) Int. Cl.
*H01G 4/224* (2006.01)
*H01G 2/06* (2006.01)
*H01G 4/228* (2006.01)

(52) U.S. Cl.
CPC ............ *H01G 2/065* (2013.01); *H01G 4/224* (2013.01); *H01G 4/228* (2013.01)

(58) Field of Classification Search
CPC ......... H01G 4/228; H01G 4/224; H01G 2/065
See application file for complete search history.

(56) References Cited

U.S. PATENT DOCUMENTS

| | | | | |
|---|---|---|---|---|
| 5,041,696 | A | * | 8/1991 | Utner ..................... H01G 2/065 |
| | | | | 361/310 |
| 5,771,149 | A | * | 6/1998 | Osaki ..................... H01G 4/224 |
| | | | | 361/308.1 |
| 5,867,360 | A | | 2/1999 | Kishishita et al. |
| 9,978,525 | B2 | * | 5/2018 | Park ....................... H01G 2/103 |
| 2013/0141850 | A1 | | 6/2013 | Honda et al. |
| 2016/0006186 | A1 | | 1/2016 | Aizawa |
| 2018/0182553 | A1 | * | 6/2018 | Yazawa ................. H01G 4/224 |
| 2018/0374640 | A1 | * | 12/2018 | Akiyoshi ................ H01G 4/30 |
| 2019/0096579 | A1 | * | 3/2019 | Takeoka .................. H01G 4/33 |
| 2020/0365324 | A1 | | 11/2020 | Ri et al. |

FOREIGN PATENT DOCUMENTS

| | | | |
|---|---|---|---|
| CN | 206574601 U | | 10/2017 |
| CN | 110164692 A | | 8/2019 |
| JP | 59014329 U | * | 1/1984 |
| JP | 01207918 A | * | 8/1989 |
| JP | 2004-040945 A | | 2/2004 |
| JP | 2009059724 A | * | 3/2009 |
| JP | 2011-040683 A | | 2/2011 |
| JP | 2011-040684 A | | 2/2011 |

(Continued)

*Primary Examiner* — David M Sinclair
(74) *Attorney, Agent, or Firm* — Oliff PLC

(57) ABSTRACT

An electronic device includes a chip component, a conductive terminal, a case, and a fixation part. The chip component includes a terminal electrode on an end surface of the chip component. The conductive terminal is connected to the terminal electrode. The case includes an accommodation recess for accommodating the chip component. The fixation part fixes the case to an installation portion.

5 Claims, 24 Drawing Sheets

(56) References Cited

FOREIGN PATENT DOCUMENTS

| | | | |
|---|---|---|---|
| JP | 2016192466 A | * | 11/2016 |
| JP | 6243305 B2 | | 12/2017 |
| KR | 1998-0064420 A | | 10/1998 |
| KR | 100866518 B1 | * | 11/2008 |
| KR | 100866518 B1 | | 11/2008 |
| KR | 101360103 B1 | | 2/2014 |
| WO | 2014/132459 A1 | | 9/2014 |
| WO | 2015/133218 A1 | | 9/2015 |
| WO | 2019/167382 A1 | | 9/2019 |

* cited by examiner

ELECTRONIC DEVICE INCLUDING CHIP COMPONENT AND CASE

BACKGROUND OF THE INVENTION

The present invention relates to an electronic device including a case for containing a chip component, such as a multilayer ceramic capacitor.

In addition to a normal electronic device in which a chip component is directly surface-mounted on a substrate alone, for example, as shown in Patent Document 1, an electronic device in which a chip component is contained in a case is known as an electronic device such as a multilayer ceramic capacitor.

It is reported that this kind of electronic device protects the chip component from impact or so and is utilized in a field requiring durability, reliability, and the like.

By the way, for example, when a power supply circuit is configured, a filter module may be structured by a chip component, and the filter module may be incorporated and fixed inside a housing (hereinafter, an installation portion) made of a sheet metal or so. For the electronic device in which the chip component is housed in the case, it is convenient if the filter module is configured in such a manner and can thereafter be fixed at a desired position of the installation portion. In the conventional technique, however, it is not easy to fix the electronic device in which the chip component is housed in the case to the installation portion in the above-mentioned manner.

Patent Document 1: JP2011040684 (A)

BRIEF SUMMARY OF INVENTION

The present invention has been achieved under such circumstances. It is an object of the invention to provide an electronic device capable of being easily fixed at a desired position of an installation portion.

To achieve the above object, an electronic device according to the present invention includes:
 a chip component including a terminal electrode on an end surface of the chip component;
 a conductive terminal connected to the terminal electrode;
 a case including an accommodation recess for accommodating the chip component; and
 a fixation part for fixing the case to an installation portion.

The electronic device according to the present invention includes a fixation part for fixing the case to an installation portion. Thus, the case can be fixed at a desired position based on a fixation position of the fixation part with a simple operation of only fixing the fixation part to the installation portion. Thus, the electronic device according to the present invention can easily be fixed at a desired position of the installation portion.

Preferably, the case is fixed to the installation portion with a fastener in the fixation part. In this situation, the case is fixed to the installation portion only by fixing the fixation part to the installation portion with the fastener, and the electronic device can thereby easily be fixed at a desired position of the installation portion.

Preferably, the fixation part is disposed outside an outer wall forming the accommodation recess. When the fixation part is fixed to the installation portion using the outside space of the outer wall forming the accommodation recess, it is possible to improve the workability for fixing the fixation part to the installation portion and to easily fix the electronic device at a desired position of the installation portion.

The fixation part may be provided to form a part of the conductive terminal. When the conductive terminal is partly utilized for the fixation part, it is possible to prevent an increase in the number of parts due to the installation of the fixation part and to simplify the structure of the electronic device.

Preferably, the conductive terminal includes a terminal side part extending toward an outside of an outer wall forming the accommodation recess, and a terminal opening part is formed in the terminal side part. In this situation, the fixation part can be fixed to the installation portion with a simple operation of, for example, inserting the fastener into the terminal opening part. Thus, the electronic device can easily be fixed at a desired position of the installation portion.

The fixation part may be provided to form a part of the case. When the case is partly utilized for the fixation part, it is possible to prevent an increase in the number of parts due to the installation of the fixation part and to simplify the structure of the electronic device.

Preferably, the case includes a case side part formed outside an outer wall forming the accommodation recess, and a case opening part is formed in the case side part. In this situation, the fixation part can be fixed to the installation portion with a simple operation of, for example, inserting the fastener into the case opening part. Thus, the electronic device can easily be fixed at a desired position of the installation portion.

Preferably, the conductive terminal is fixed to the installation portion directly or with the case in the fixation part. In case of directly fixing the conductive terminal to the installation portion, since the case can be fixed to the installation portion with the conductive terminal in the fixation part, the fixation part does not need to be disposed in the case, and the structure of the case can be simplified. In case of fixing the conductive terminal to the fixation part with the case, the case can directly be fixed to the installation portion in the fixation part and can stably be fixed to the installation portion.

The fixation part may be structured separately from the conductive terminal and the case. In this situation, since the conductive terminal and the case are not provided with the fixation part, the structure of the conductive terminal and the cases can be simplified.

Preferably, the installation portion is made of a conductor. When the fastener is made of a conductor, for example, the conductive terminal and the installation portion can electrically be connected to each other with the fastener at the time of fixing the fixation part formed by a part of the conductive terminal to the installation portion. Thus, the chip component connected to the conductive terminal can be connected to the ground.

Preferably, an engagement groove for engaging an end of the conductive terminal is formed along a periphery of the accommodation recess in the case. When the end of the conductive terminal is engaged with the engagement groove, the conductive terminal can stably be fixed to the case.

Preferably, the electronic device according to the present invention further includes a connection part connecting a plurality of the cases. When the plurality of the cases is connected to each other with the connection part, a combined body of a plurality of electronic devices can be structured. Thus, in addition to being able to handle a plurality of electronic devices as a unit, the user can optimize the configuration for easy-to-use form for themselves by making an adjustment of, for example, increasing or decreasing the number of connected cases based on the usage situation.

DETAILED DESCRIPTION OF INVENTION

Hereinafter, the present invention is explained based on embodiments shown in the figures.

First Embodiment

Figure 1A:
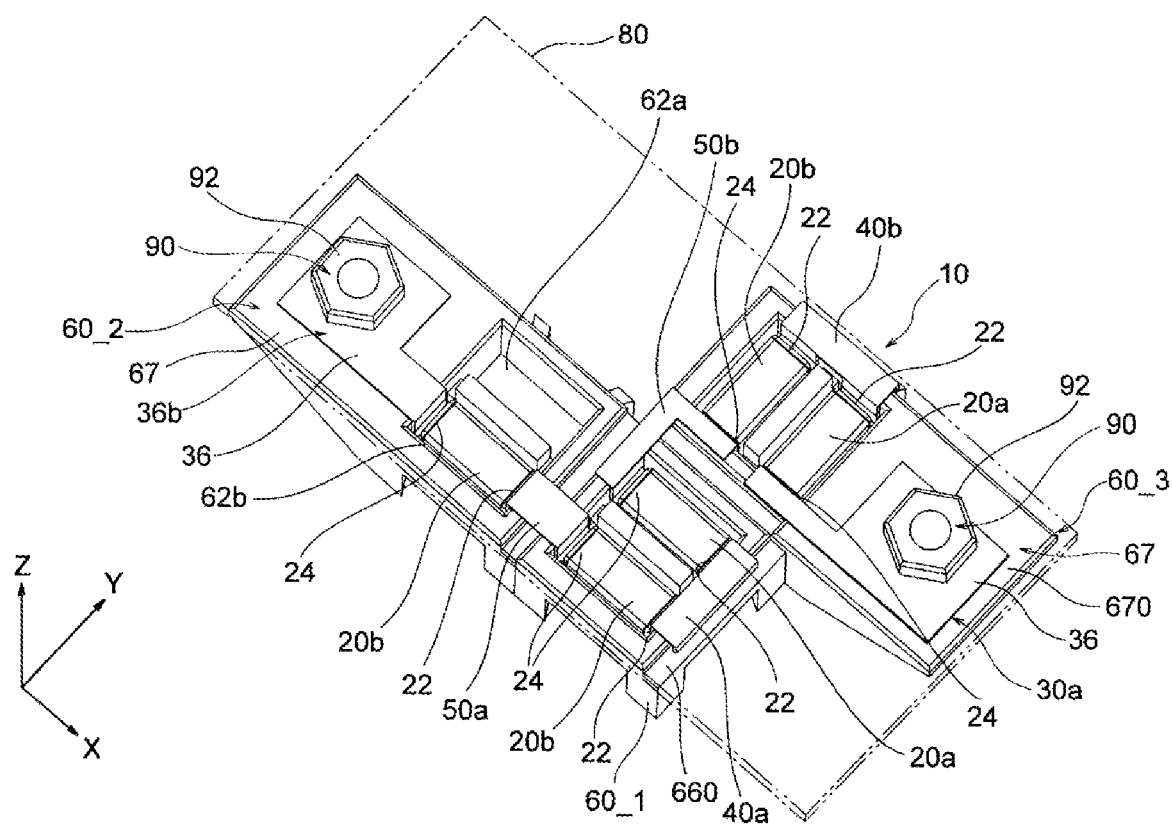
FIG. 1A is a perspective view of an electronic device according to First Embodiment of the present invention.

As shown in FIG. 1A, an electronic device 10 according to First Embodiment of the present invention includes two capacitor chips (chip components) 20a and 20b, a plurality of conductive terminals, insulation cases 60_1 to 60_3, and a fixation part. In the present embodiment, the electronic device 10 is provided with individual metal terminals 30a and 30b, common metal terminals 40a and 40b, and connection metal terminals 50a and 50b as the conductive terminals. In the present embodiment, the fixation part is provided on the cases 60_2 and 60_3 and the individual metal terminals 30a and 30b. The details of the conductive terminals and the fixation part are mentioned below.

Figure 4:
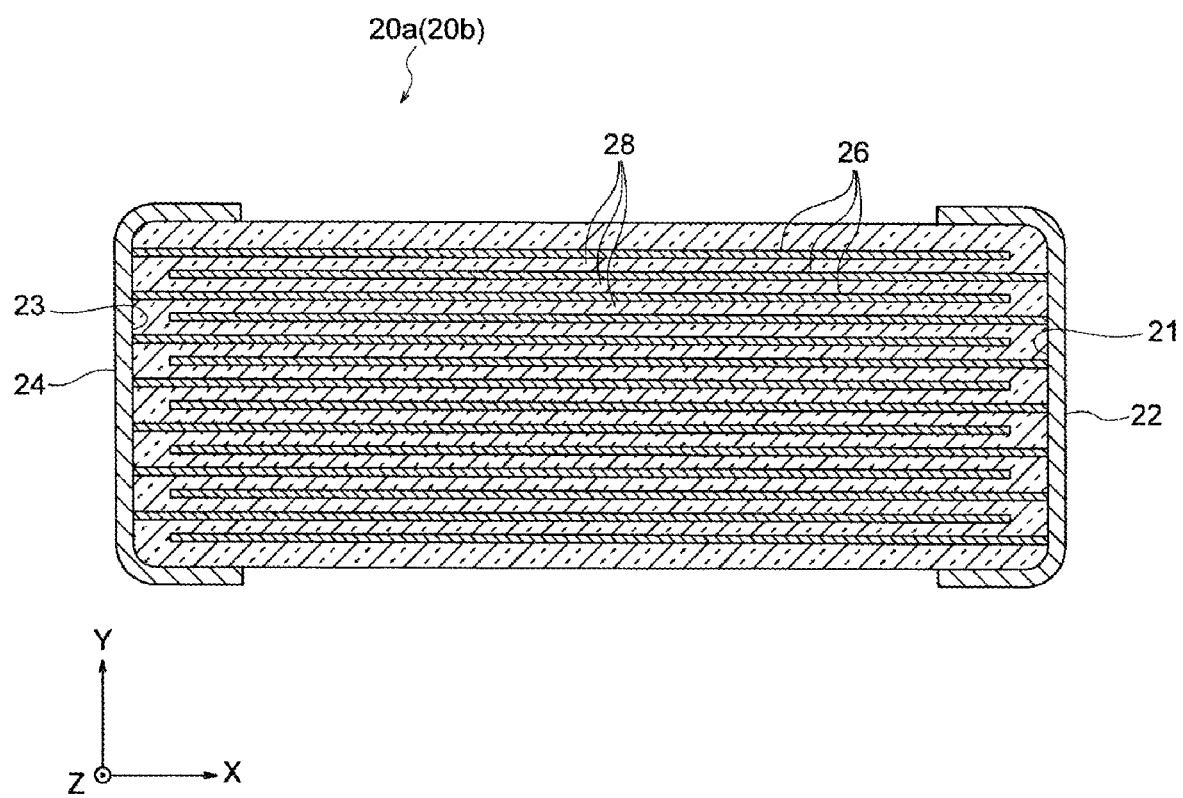
FIG. 4 is a longitudinal cross-sectional view of a chip component shown in FIG. 1A.

The capacitor chips 20a and 20b each have a substantially rectangular parallelepiped shape and have substantially the same shape and size. As shown in FIG. 4, the capacitor chip 20a (20b) has an element body where internal electrode layers 26 and dielectric layers 28 are laminated in the Y-axis direction, and a first terminal electrode 22 and a second terminal electrode 24 are respectively formed on a first end surface 21 and a second end surface 23 facing each other in the longitudinal direction of the element body (X-axis direction) and are connected to either of the internal electrode layers 26 next to each other in the lamination direction.

The dielectric layers 28 of the capacitor chips 20a and 20b are made of any dielectric material, such as calcium titanate, strontium titanate, barium titanate, and these mixture. The thickness of each of the dielectric layers 28 is not limited, but is normally 1 μm to several hundred μm. In the present embodiment, preferably, each of the dielectric layers 28 has a thickness of 1.0-5.0 μm.

The internal electrode layers 26 contain any conductive material, and a relatively inexpensive base metal can be used when the constituent material of the dielectric layers 28 has reduction resistance. Preferably, the base metal is Ni or a Ni alloy. The Ni alloy is preferably an alloy of Ni and one or more elements selected from Mn, Cr, Co, and Al, and the Ni content of the alloy is preferably 95 wt. % or more. Incidentally, Ni or the Ni alloy may contain various trace components, such as P, in an amount of about 0.1 wt. % or less. The internal electrode layers 26 may be formed using a commercially available electrode paste. The thickness of each of the internal electrode layers 26 may appropriately be determined based on application or so.

The first terminal electrode 22 and the second terminal electrode 24 are also made of any material and are normally made of copper, copper alloy, nickel, nickel alloy, etc., but can also be made of silver, alloy of silver and palladium, etc. The terminal electrode 22 (24) has any thickness, but normally has a thickness of about 10-50 μm. Incidentally at least one metal film selected from Ni, Cu, Sn, etc. may be formed on the surfaces of the first terminal electrode 22 and the second terminal electrode 24.

The capacitor chip 20a (20b) has shape and size appropriately determined based on purpose and application. For example, the capacitor chip 20a (20b) has a length of 1.0-6.5 mm (size in the X-axis direction shown in FIG. 1A)×a width of 0.5-5.5 mm (size in the Z-axis direction shown in FIG. 1A), and a thickness of about 0.3-3.5 mm (size in the Z-axis direction shown in FIG. 1A). The capacitor chips 20a and 20b may have different size and shape. In the figures, the X-axis, the Y-axis, and the Z-axis are perpendicular to each other.

Figure 2A:
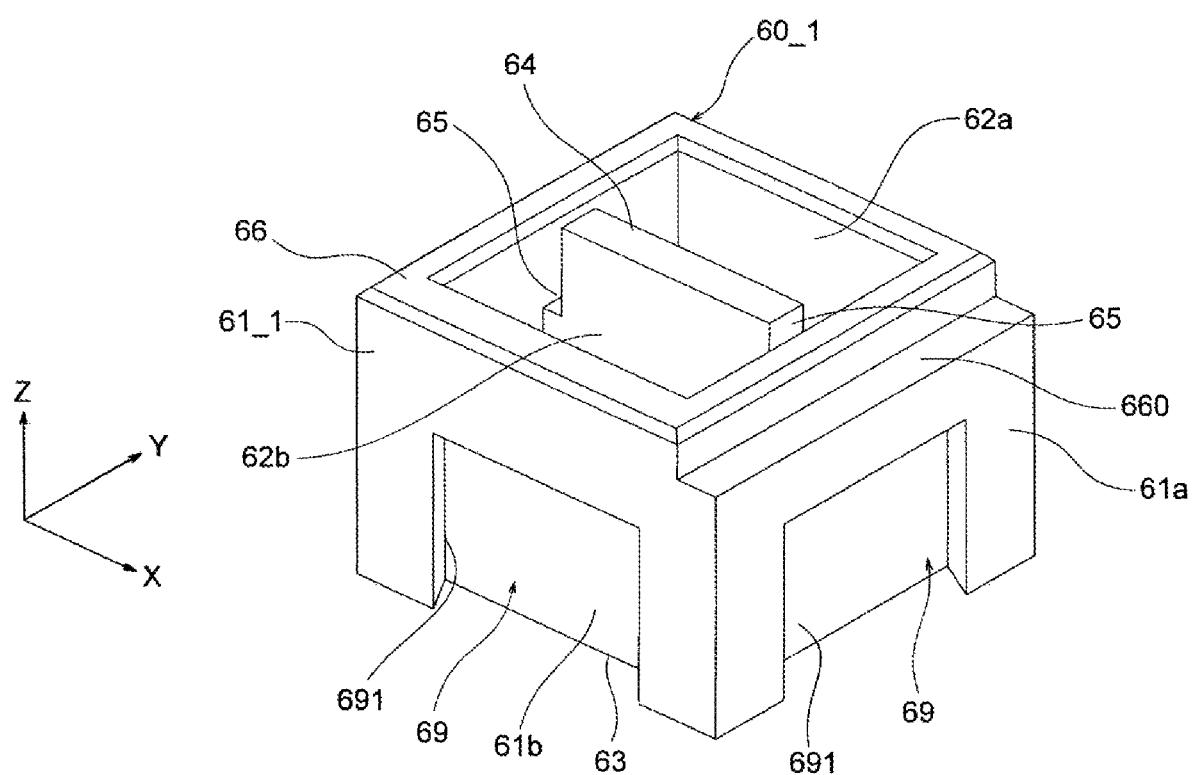
FIG. 2A is a perspective view illustrating one of a plurality of cases shown in FIG. 1A.

As shown in FIG. 2A, the insulation case 60_1 is structured by a substantially cubic housing and includes an outer wall 61_1 and a bottom wall 63 surrounding accommodation recesses 62a and 62b opening upward in the Z axis.

The accommodation recesses 62a and 62b are arranged adjacent to each other in the Y-axis direction, and most of them are partitioned by a partition wall 64. The accommodation recesses 62a and 62b are partly communicated with each other by two communication grooves 65 formed on the partition wall 64.

Either of the communication grooves 65 is formed on one side of the partition wall 64 in the X-axis direction, and one end of the partition wall 64 in the X-axis direction is notched in the Z-axis direction by this communication groove 65. The other communication groove 65 is formed on the other side of the partition wall 64 in the X-axis direction, and the other end of the partition wall 64 in the X-axis direction is notched in the Z-axis direction by this communication groove 65.

The communication grooves 65 are formed along an inner wall surface of the outer wall 61_1 surrounding the accommodation recesses 62a and 62b. The groove depth of the communication grooves 65 in the Z-axis direction is formed to be shallower than the depth of the accommodation recesses 62a and 62b in the Z-axis direction. The width of the communication groove 65 in the X-axis direction is a width that allows each of the metal terminals to be inserted and fixed.

The opening surfaces of the accommodation recesses 62a and 62b of the insulation case 60_1 are formed only on the upper surface in the Z-axis direction. The outer wall 61_1 and the bottom wall 63 are not provided with any of holes, notches, grooves, or openings that are communicated with the outside of the insulation case 60_1. The bottom wall 63 is separated into one side and the other side in the Y-axis direction by the partition wall 64. Along the opening surfaces of the accommodation recesses 62a and 62b, the insulation case 60_1 is provided with an opening edge surface 66 on the upper surface of the outer wall 61_1 in the Z-axis direction.

The opening edge surface 66 surrounding the accommodation recesses 62a and 62b includes an engagement groove 660 on one side in the X-axis direction. The engagement groove 660 extends from one end to the other end of the outer wall 61_1 in the Y-axis direction along the periphery of the accommodation recesses 62a and 62b.

The extension direction of the engagement groove 660 is a direction connecting between the first terminal electrode 22 of the capacitor chip 20a and the first terminal electrode 22 of the capacitor chip 20b accommodated in the accommodation recesses 62a and 62b. In addition, the extension direction of the engagement groove 660 is perpendicular to that of the partition wall 64. The details are mentioned below, but as shown in FIG. 1A, the engagement groove 660 is engageable with the end of each of the metal terminals (in the illustrated example, a lateral electrode section 46 of the common metal terminal 40a shown in FIG. 3).

The space sizes of the accommodation recesses 62a and 62b are large enough to accommodate two capacitor chips 20a and 20b next to each other in the Y-axis direction. The two capacitor chips 20a and 20b are accommodated in the accommodation recesses 62a and 62b so that their longitudinal directions correspond to the X-axis direction.

The width of the accommodation recess 62a (62b) in the Y-axis direction is determined so that the capacitor chip 20a (20b) can enter the accommodation recess 62a (62b). The depth of the accommodation recess 62a (62b) in the Z-axis direction is determined so that the upper end of the capacitor chip 20a (20b) in the Z-axis direction does not protrude upward in the Z-axis direction from the opening edge surface 66 at the time of accommodating the capacitor chip 20a (20b) into the accommodation recess 62a (62b).

However, the upper end of the capacitor chip 20a (20b) in the Z-axis direction may slightly protrude upward in the Z-axis direction from the opening edge surface 66. The insulation case 60_1 is made of an insulator, such as ceramic, glass, and synthetic resin. The insulator may be made of a flame-retardant material.

In the present embodiment, the capacitor chip 20a (20b) can easily be accommodated into the accommodation recess 62a (62b). When the capacitor chip 20a (20b) is accommodated in the accommodation recess 62a (62b), the capacitor chip 20a (20b) can effectively be protected from impact or so.

Figure 2B:
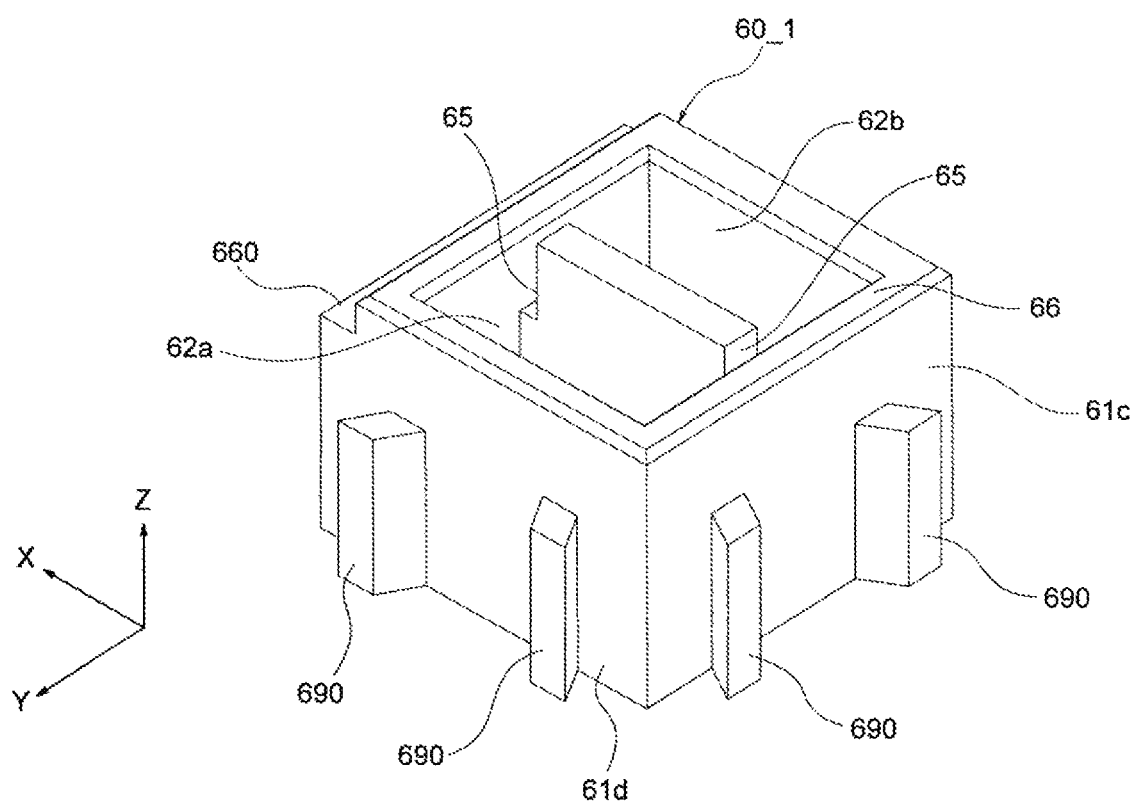
FIG. 2B is a perspective view of the case shown in FIG. 2A when rotated around the Z-axis (rotation axis) by 180 degrees.

Hereinafter, four outer surfaces of the insulation case 60_1 are defined as outer surfaces 61a to 61d. As shown in FIG. 2A and FIG. 2B, the outer surface 61a is an outer surface near the engagement groove 660 mentioned below, the outer surface 61b is an outer surface located next to the outer surface 61a in the clockwise direction, the outer surface 61c is an outer surface located next to the outer surface 61b in the clockwise direction and located opposite to the outer surface 61a in the X-axis direction, and the outer surface 61d is an outer surface located next to the outer surface 61c in the clockwise direction and located opposite to the outer surface 61b in the Y-axis direction.

A connection part 69 is formed on each of the outer surfaces 61a to 61d. For more detail, a pair of engagement protrusions 690 and 690 is formed on each of the outer surfaces 61c and 61d as shown in FIG. 2B, and an engagement recess 691 is formed on each of the outer surfaces 61a and 61b as shown in FIG. 2A.

The engagement recess 691 is recessed toward the inside of the insulation case 60_1 (in the thickness direction of the outer wall 61_1) at a substantially central part of the outer surface 61a (61b). The engagement recess 691 formed on the outer surface 61a becomes wider toward the inside of the insulation case 60_1 (recessing direction of the engagement recess 691) in the width direction (Y-axis direction). The engagement recess 691 formed on the outer surface 61b becomes wider toward the inside of the insulation case 60_1 (recessing direction of the engagement recess 691) in the width direction (X-axis direction). Thus, each of the engagement recess 691 has a trapezoidal transverse cross-sectional shape when cut in a plane perpendicular to the Z-axis. Each of the engagement recesses 691 extends from above the substantially central part in the Z-axis direction to the lower end in the Z-axis direction on the outer surface 61a (61b).

As shown in FIG. 2B, the pair of engagement protrusions 690 and 690 formed on the outer surface 61c is formed with a predetermined interval in the Y-axis direction and protrudes toward the outside of the insulation case 60_1 (in the normal direction of the outer surface 61c) on one side and the other side of the outer surface 61c in the Y-axis direction, and the pair of engagement protrusions 690 and 690 formed on the outer surface 61d is formed with a predetermined interval in the X-axis direction and protrudes toward the outside of the insulation case 60_1 (in the normal direction of the outer surface 61d) on one side and the other side of the outer surface 61d in the X-axis direction. The engagement protrusions 690 are formed so that their cross-sectional shape is a substantially parallelogram when cut on a plane perpendicular to the extension direction of the engagement protrusions 690.

The engagement protrusions 690 formed on the outer surface 61c extend to spread toward the outside of the insulation case 60_1 in the Y-axis direction. That is, the engagement protrusions 690 formed on the outer surface 61c do not linearly extend in the X-axis direction, but extends while being inclined at a predetermined inclination angle to the X-axis.

The engagement protrusions 690 formed on the outer surface 61d extend to spread toward the outside of the insulation case 60_1 in the X-axis direction. That is, the engagement protrusions 690 formed on the outer surface 61d do not linearly extend in the Y-axis direction, but extends while being inclined at a predetermined inclination angle to the Y-axis. The engagement protrusions 690 extend from above the substantially central part in the Z-axis direction to the lower end in the Z-axis direction on the outer surface 61c (61d).

The details are described below, but the other insulation cases 60_2 and 60_3 are also provided with the connection part 69, and the insulation cases 60_1, 60_2, and 60_3 can be connected to each other with the engagement protrusions 690 or the engagement recesses 691 (see FIG. 1B).

Figure 2C:
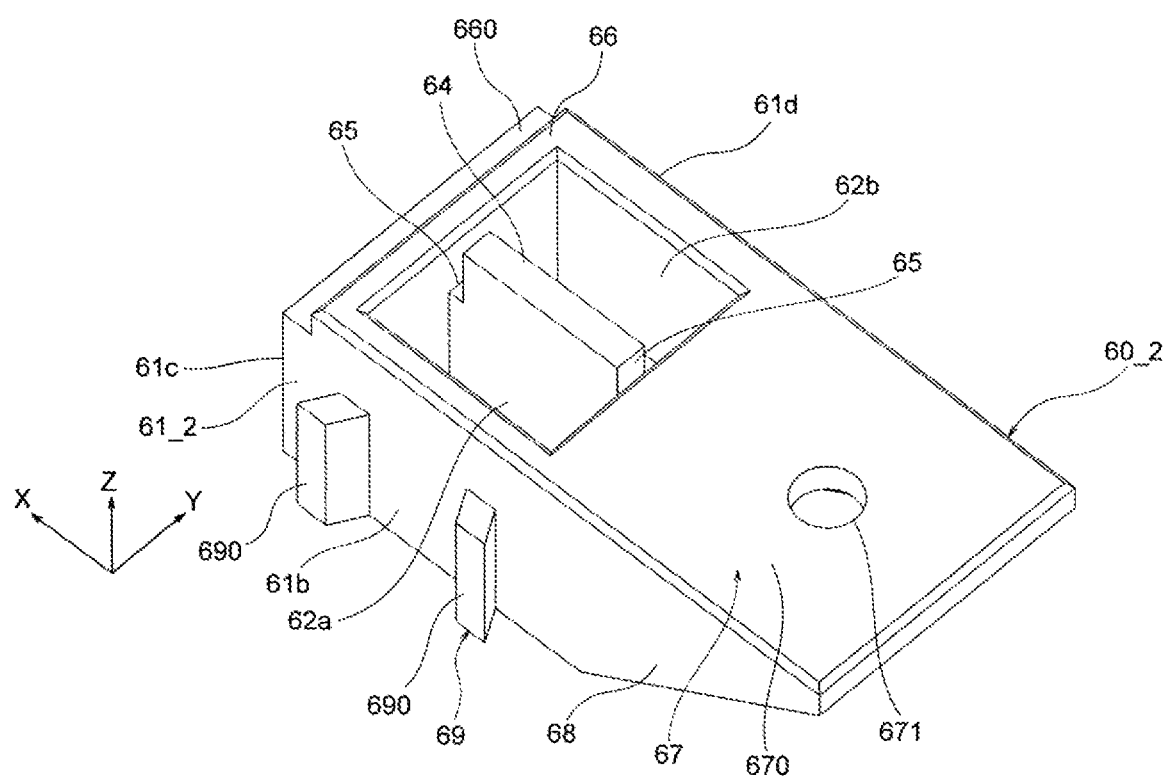
FIG. 2C is a perspective view illustrating one of a plurality of cases shown in FIG. 1A.
Figure 2D:
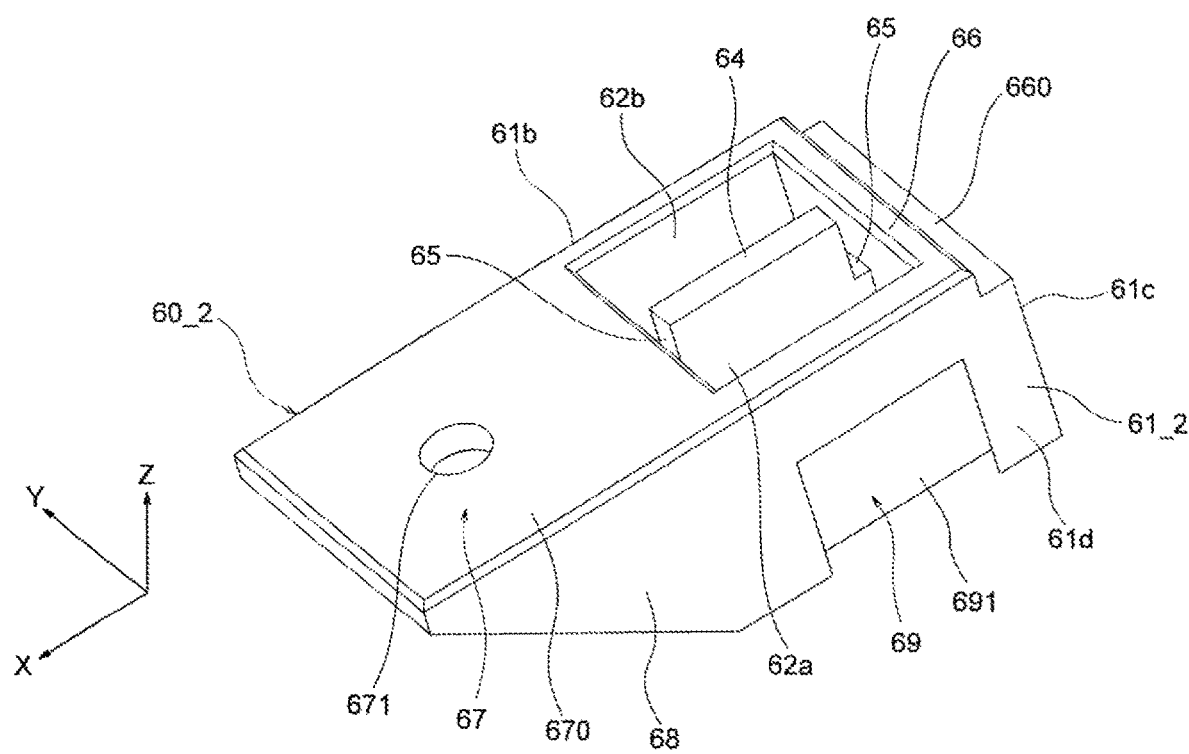
FIG. 2D is a perspective view of the case shown in FIG. 2C when rotated around the Z-axis (rotation axis) by 180 degrees.

As is clear from the comparison between FIG. 2C and FIG. 2B, the insulation case 60_2 shown in FIG. 2C is different from the insulation case 60_1 in that the insulation case 60_2 shown in FIG. 2C further includes a case-side fixation part 67 and a pair of lateral wall parts 68 and 68 in addition to the structure of the insulation case 60_1.

The case-side fixation part 67 functions as a fixation part for fixing the insulation case 60_2 to an installation portion 80 shown in FIG. 1A, and the fixation part is provided to form a part of the case 60_2. Various types of installation portions 80 can be considered, and examples of the installation portions 80 include a case (housing) for accommodating the electronic device 10 and a bus bar for fixing the electronic device 10. In the present embodiment, the installation portion 80 is made of a conductor. The case-side fixation part 67 is provided on the outside of the outer wall 61_2 forming the accommodation recesses 62a and 62b and is formed adjacent to the outer wall 61_2. The case-side fixation part 67 is fixed to the installation portion 80 with a fastener 90 (see FIG. 1A and FIG. 1B). Incidentally, the installation portion 80 includes an opening for inserting a bolt 91 constituting the fastener 90.

Figure 1B:
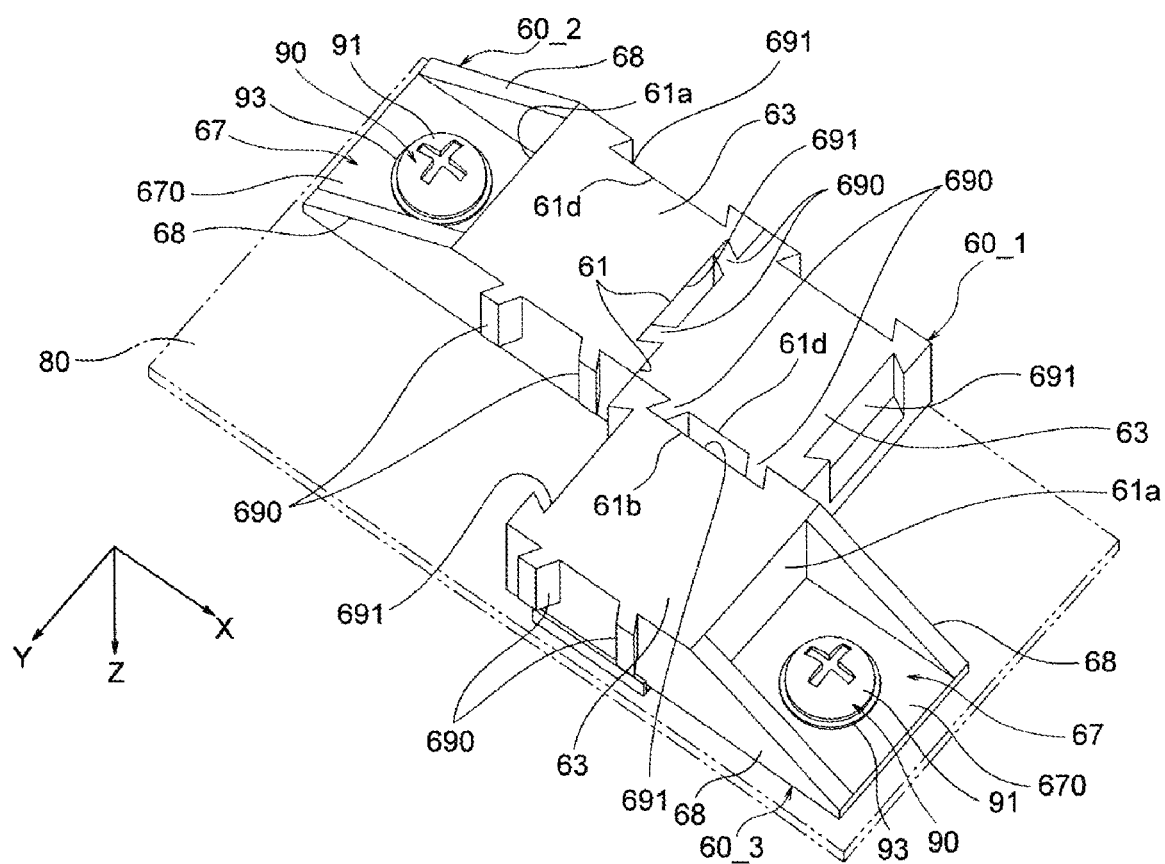
FIG. 1B is a perspective view of the electronic device shown in FIG. 1A when viewed from below.

In the present embodiment, as shown in FIG. 1A and FIG. 1B, the fastener 90 is made of a conductor and is structured by the bolt 91, a nut 92, and a washer 93. When the fastener 90 is fixed to the installation portion 80, the fastener 90 and the installation portion 80 are connected electrically.

As shown in FIG. 2C, the case-side fixation part 67 includes a case side part 670 and a case opening part 671. As shown in FIG. 1B and FIG. 2C, the case side part 670 has a flat plate shape and has a substantially square exterior shape when viewed from above or below.

The case side part 670 is formed integrally (or continuously) with the outer wall 61_2 on the outside of the outer wall 61_2 forming the accommodation recesses 62a and 62b. The case side part 670 protrudes outward in the X-axis direction from the upper end of the outer wall 61_2 (specifically, the upper end of the outer surface 61a) located on one side in the X-axis direction. The case side part 670 is formed to be flush with the opening edge surface 66.

In the illustrated example, the protrusion direction of the case side part 670 is a direction away from the accommodation recesses 62a and 62b and is the longitudinal direction of the capacitor chips 20a and 20b to be accommodated in the accommodation recesses 62a and 62b. The protrusion width of the case side part 670 in the X-axis direction is not limited as long as the fastener 90 can be fixed to the case side part 670. In the illustrated example, the protrusion width of the case side part 670 in the X-axis direction is substantially equal to the length of the outer wall 61_2 in the X-axis direction.

The case opening part 671 is formed at a substantially central part of the case side part 670. The case opening part 671 has a substantially circular shape and penetrates the case side part 670 in the Z-axis direction. The diameter (opening width) of the case opening part 671 is not limited as long as the bolt 91 can be inserted thereinto.

The pair of lateral wall parts 68 and 68 is formed at one end and the other end of the case side part 670 in the Y-axis direction. The lateral wall parts 68 are formed integrally (or continuously) with the outer wall 61_2 and protrude outward in the X-axis direction from one side of the outer wall 61_2 in the X-axis direction (specifically, from the end of the outer surface 61a in the Y-axis direction).

The lateral wall parts 68 become narrower in the Z-axis direction toward the protrusion direction of the lateral wall parts 68. Thus, the exterior shape of the lateral wall parts 68 when viewed from the Y-axis direction is a substantially triangular shape (or trapezoid) sharpened toward the protrusion direction of the lateral wall parts 68. The protrusion direction of the lateral wall parts 68 is the same as the protrusion direction of the case side part 670. In addition, the protrusion width of the lateral wall parts 68 in the X-axis direction is the same as the protrusion width of the case side part 670 in the X-axis direction.

The bolt 91 can be inserted into the case opening part 671. Here, as shown in FIG. 1B, the bolt 91 is inserted from the bottom wall 63 side, and the head of the bolt 91 is thereby disposed on the back surface of the case side part 670. In the illustrated example, the washer 93 is interposed between the head of the bolt 91 and the back surface of the case side part 670. The leg of the bolt 91 passing through the inside of the case opening part 671 is fixed with the nut 92 shown in FIG. 1A. As mentioned below, the bolt 91 is inserted through the individual metal terminal 30a in addition to the case opening part 671 and is fixed with the nut 92 in such a state.

As shown in FIG. 1B and FIG. 2C, the pair of engagement protrusions 690 and 690 is formed on the outer surface 61b, and the engagement recess 691 is formed on the outer surface 61c (61d).

Figure 2E:
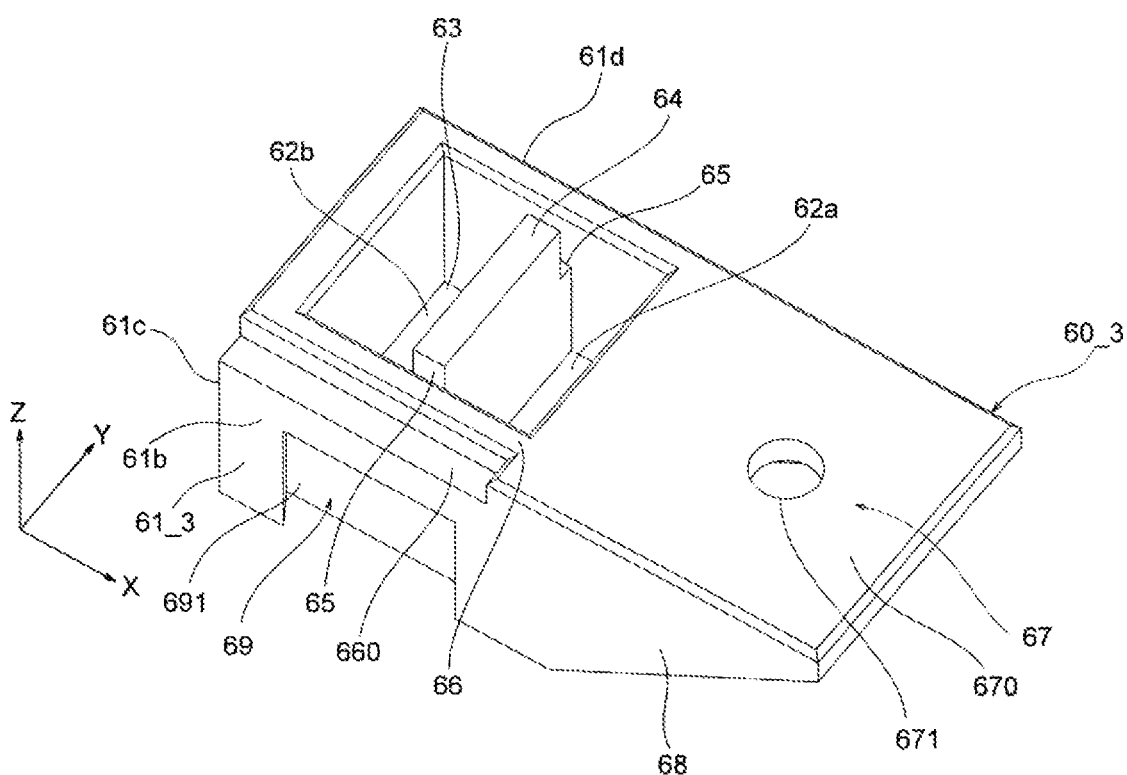
FIG. 2E is a perspective view illustrating one of a plurality of cases shown in FIG. 1A.

As is clear from the comparison between FIG. 2E and FIG. 2C, the insulation case 60_3 shown in FIG. 2E is different from the insulation case 60_2 shown in FIG. 2C in the following matters. In the insulation case 60_3, the longitudinal direction of the partition wall 64 or the accommodation recesses 62a and 62b is the Y-axis direction. Thus, the two capacitor chips 20a and 20b are accommodated in the accommodation recesses 62a and 62b so that the longitudinal direction of the capacitor chips 20a and 20b correspond with the Y-axis direction.

In the insulation case 60_3, the engagement groove 660 is formed at one end in the Y-axis direction. Since the engagement groove 660 is formed to face the terminal electrodes 24 and 24 of the capacitor chips 20a and 20b accommodated in the accommodation recesses 62a and 62b, the first individual metal terminal 30a and the second connection metal terminal 50b (see FIG. 1A) can easily be connected to the terminal electrodes 24 and 24 of the capacitor chips 20a and 20b at the time of engaging the first individual metal terminal 30a and the second connection metal terminal 50b (see FIG. 1A) with the engagement groove 660.

In the insulation case 60_3, the engagement recess 691 is formed on the outer surface 61b, and the pair of engagement protrusions 690 and 690 (see FIG. 1B) is formed on the outer surface 61d located on the other side of the outer surface 61b in the Y-axis direction.

The case-side fixation part 67 of the insulation case 60_3 functions as a fixation part for fixing the insulation case 60_3 to the installation portion 80 shown in FIG. 1A, and the fixation part is provided to form a part of the case 60_3. The case-side fixation part 67 is formed on the outside of the outer wall 61_3 forming the accommodation recesses 62a and 62b and is formed next to the outer wall 61_3. The structure of the case-side fixation part 67 of the insulation case 60_3 is similar to that of the case-side fixation part 67 of the insulation case 60_2, and their overlapping matters are not thereby explained.

As shown in FIG. 1A and FIG. 1B, the insulation case 60_1, the insulation case 60_2, and the insulation case 60_3 can be engaged with the pair of engagement protrusions 690 and 691 and the engagement recesses 691 included in the insulation cases 60_1 to 60_3.

For more details, the outer surface 61c of the insulation case 60_1 and the outer surface 61c of the insulation case 60_2 are arranged to face each other, and the pair of engagement protrusions 690 and 690 formed on the outer surface 61c of the insulation case 60_1 engages with the engagement recess 691 formed on the outer surface 61c of the insulation case 60_2. Among the pair of engagement protrusions 690 and 690, one engagement protrusion 690 engages with one end of the engagement recess 691 in the Y-axis direction, and the other engagement protrusion 690 engages with the other end of the engagement recess 691 in the Y-axis direction.

Likewise, the outer surface 61d of the insulation case 60_1 and the outer surface 61b of the insulation case 60_3 are arranged to face each other, and the pair of engagement protrusions 690 and 690 formed on the outer surface 61d of the insulation case 60_1 engages with the engagement recess 691 formed on the outer surface 61b of the insulation case 60_3. Among the pair of engagement protrusions 690 and 690, one engagement protrusion 690 engages with one end of the engagement recess 691 in the X-axis direction, and the other engagement protrusion 690 engages with the other end of the engagement recess 691 in the X-axis direction.

The pair of engagement protrusions 690 and 690 is inserted while sliding from the lower end side (the side where the bottom wall 63 is formed) toward the upper end side of the engagement recess 691 and are fixed in contact with the upper end of the engagement recess 691. Accordingly, the insulation cases 60_1 to 60_3 are connected to each other.

Figure 3:
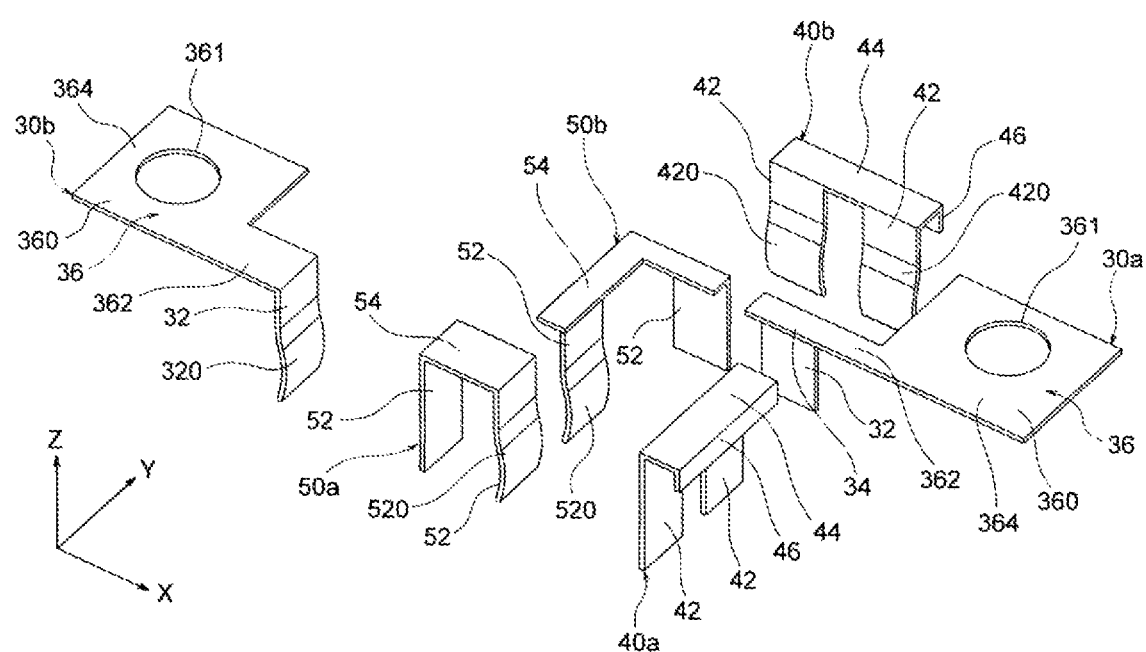
FIG. 3 is a perspective view of conductive terminals shown in FIG. 1A.

As shown in FIG. 3, the first individual metal terminal 30a is formed by bending a single conductive plate piece (e.g., metal plate). The thickness of the metal plate is not limited, but is preferably about 0.01-2.0 mm. The first individual metal terminal 30a includes an inner electrode part 32, an opening edge electrode part 34, and a terminal-side fixation part 36.

The inner electrode part 32 is inserted along the inner side wall on one side in the Y-axis direction of the accommodating recess 62a of the insulation case 60_3 shown in FIG. 2E. As shown in FIG. 1A and FIG. 3, the inner electrode part 32 contacts with the second terminal electrode 24 of the capacitor chip 20a and is electrically connected thereto. The opening edge electrode part 34 is formed continuously to the inner electrode part 32 along the opening edge surface 66 (see FIG. 2E). The opening edge electrode part 34 is preferably in contact with the opening edge surface 66, but there may be some gaps therebetween.

In the first individual metal terminal 30a, the terminal-side fixation part 36 serves to fix the first individual metal terminal 30a to the insulation case 60_3. Thus, the insulation case 60_3 also serves as a fixation base for fixing the first individual metal terminal 30a. The terminal-side fixation part 36 constitutes a fixation part for fixing the insulation case 60_3 to the installation portion 80 together with the case-side fixation part 67 of the insulation case 60_3, and the fixation part is provided to form a part of the first individual metal terminal 30a.

The terminal-side fixation part 36 is fixed to the insulation case 60_3 with the fastener 90. In the present embodiment, the insulation case 60_3 is fixed to the installation portion 80, and the first individual metal terminal 30a is thereby indirectly fixed to the installation portion 80 with the insulation case 60_3. The terminal-side fixation part 36 is disposed on the outside of the outer wall 61_3 (see FIG. 2E) forming the accommodation recesses 62a and 62b and is disposed adjacent to the outer wall 61_3.

The terminal-side fixation part 36 includes a terminal side part 360 and a terminal opening part 361. The terminal side part 360 extends toward the outside of the outer wall 61_3 (see FIG. 2E) forming the accommodation recesses 62a and 62b of the insulation case 60_3.

As shown in FIG. 3, the terminal side part 360 includes a narrow part 362 and a wide part 364. The narrow part 362 is formed continuously to the opening edge electrode part 34 and protrudes from the opening edge electrode part 34 to the positive side in the X-axis direction. The width of the narrow part 362 in the Y-axis direction is substantially equal to that of the opening edge electrode part 34 in the Y-axis direction, and the narrow part 362 corresponds with an extension of the opening edge electrode part 34 to the positive side in the X-axis direction. Thus, the extension direction of the narrow part 362 is the same as that of the opening edge electrode part 34 or as the protrusion direction of the case side part 670 of the case-side fixation part 67.

The wide part 364 is formed continuously to the narrow part 362 and has a larger area than the narrow part 362. The exterior shape of the wide part 364 when viewed from above or below is substantially square. The wide part 364 is located on the positive side of the narrow part 362 in the X-axis direction and protrudes to the positive side in the X-axis direction and the positive side in the Y-axis direction. The width of the wide part 364 in the Y-axis direction is larger than that of the narrow part 362 in the Y-axis direction. The protrusion width of the wide part 364 in the X-axis direction is not limited as long as the fastener 90 can be fixed to the wide part 364. The wide part 364 is installed on the surface of the case side part 670.

The terminal opening part 361 is formed at a substantially central part of the wide part 364. The terminal opening part 361 has a substantially circular shape and penetrates the wide part 364 in the Z-axis direction. The diameter (opening width) of the terminal opening part 361 is not limited as long as the bolt 91 constituting the fastener 90 can be inserted. Since the terminal opening 361 is disposed to overlap with the case opening part 671 (see FIG. 2E) formed on the case side part 670, the fastener 90 can be inserted into both of the case opening part 671 and the terminal opening part 361. As shown in FIG. 1A and FIG. 1B, when the bolt 91 is fixed with the nut 92, the nut 92 is disposed on the surface of the wide part 364.

As shown in FIG. 1A and FIG. 3, the second individual metal terminal 30b is different from the first individual metal terminal 30a in that the inner electrode portion 32 is provided with a curved part 320 and is connected to the end of the narrow part 362 in the X-axis direction. The inner electrode portion 32 is formed to face the second terminal electrode 24 of the capacitor chip 20b accommodated in the accommodation recess 62b and is contacted with and electrically connected to the second terminal electrode 24.

Since the inner electrode portion 32 is provided with the curved part 320, a spring force is applied to the capacitor chip 20b accommodated in the accommodation recess 62b, and the capacitor chip 20b can firmly be fixed to the accommodation recess 62b.

In the second individual metal terminal 30b, the terminal-side fixation part 36 serves to fix the second individual metal terminal 30b to the insulation case 60_2. Thus, the insulation case 60_2 also serves as a fixation base for fixing the second individual metal terminal 30b. The terminal-side fixation part 36 constitutes a fixation part for fixing the insulation case 60_2 to the installation portion 80 together with the case-side fixation part 67 of the insulation case 60_2, and the fixation part is provided to form a part of the second individual metal terminal 30b.

The terminal-side fixation part 36 is fixed to the insulation case 60_2 with the fastener 90. In the present embodiment, the insulation case 60_2 is fixed to the installation portion 80, and the second individual metal terminal 30b is thereby indirectly fixed to the installation portion 80 with the insulation case 60_2. The terminal-side fixation part 36 is disposed on the outside of the outer wall 61_2 forming the accommodation recesses 62a and 62b and is disposed adjacent to the outer wall 61_2.

The terminal-side fixation part 36 includes a terminal side part 360 and a terminal opening part 361. The terminal side part 360 extends toward the outside of the outer wall 61_2 (see FIG. 2C) forming the accommodation recesses 62a and 62b of the insulation case 60_2. Since the structure of the terminal-side fixation part 36 of the second individual metal terminal 30b is similar to that of the terminal-side fixation part 36 of the first individual metal terminal 30a, their overlapping matters are not explained.

In the second individual metal terminal 30b, the terminal-side fixation part 36 is partly disposed on the opening edge surface 66 of the insulation case 60_2, and the terminal-side fixation part 36 also serves as the opening edge electrode part 34.

Figure 7:
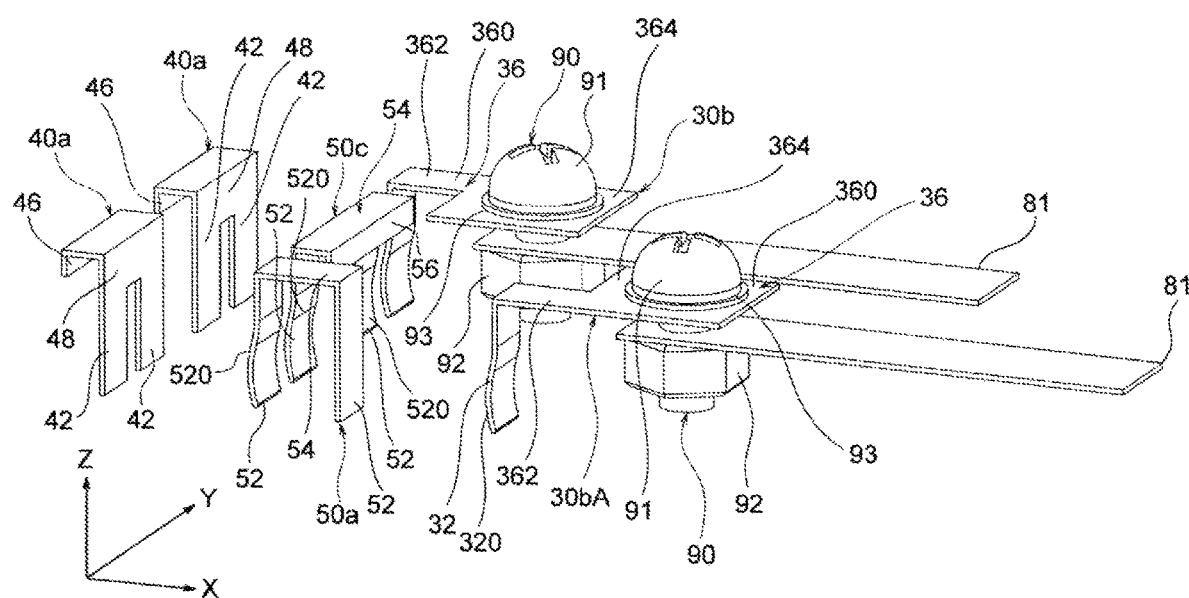
FIG. 7 is a perspective view of conductive terminals, bus bars, and fasteners shown in FIG. 5A.

The first common metal terminal 40a includes a pair of inner electrode parts 42 and 42, an opening edge electrode part 44, a side electrode part 46, and a connection part 48 (see FIG. 7). The pair of inner electrode parts 42 and 42 is respectively formed at one end and the other end of the opening edge electrode part 44 in the Y-axis direction with a predetermined interval.

Among the inner electrode parts 42 and 42, the inner electrode part 42 located on one side in the Y-axis direction is inserted into the accommodation recess 62a of the insulation case 60_1 and is contacted with and electrically connected to the first terminal electrode 22 of the first capacitor chip 20a accommodated in the accommodation recess 62a, and the inner electrode part 42 located on the other side in the Y-axis direction is inserted into the accommodation recess 62b of the insulation case 60_1 and is contacted with and electrically connected to the first terminal electrode 22 of the first capacitor chip 20b accommodated in the accommodation recess 62b. Furthermore, the terminal electrodes 22 and 22 of the capacitor chips 20a and 20b are electrically connected with the opening edge electrode part 44.

The side electrode part 46 is formed continuously to the opening edge electrode part 44 along the outer surface (outside wall) of the outer wall 61_1 of the insulation case 60_1. In the illustrated example, the side electrode part 46 is disposed along the engagement groove 660 (see FIG. 2A). In the present embodiment, the side electrode part 46 is formed to extend in the Z-axis direction along the outer surface of the outer wall 61_1 where the engagement groove 660 is located. Incidentally, the side electrode part 46 does not need to be in contact with the outer wall surface of the outer wall 61_1 and may be disposed in parallel to the outer wall surface of the outer wall 61_1 with a predetermined gap.

The second common metal terminal 40b is different from the first common metal terminal 40a in that each of the pair of inner electrode parts 42 and 42 is provided with a curved part 420.

Among the inner electrode parts 42 and 42, the inner electrode part 42 located on one side in the X-axis direction is inserted into the accommodation recess 62a of the insulation case 60_3 and is contacted with and electrically connected to the first terminal electrode 22 of the capacitor chip 20a accommodated in the accommodation recess 62a, and the inner electrode part 42 located on the other side in the X-axis direction is inserted into the accommodation recess 62b of the insulation case 60_3 and is contacted with and electrically connected to the first terminal electrode 22 of the capacitor chip 20b accommodated in the accommodation recess 62b. Furthermore, the terminal electrodes 22 and 22 of the capacitor chips 20a and 20b are electrically connected with the opening edge electrode part 44.

The first connection metal terminal 50a includes a pair of inner electrode parts 52 and 52 and a connection part 54 for connecting (jointing) the pair of inner electrode parts 52 and 52. Among the pair of inner electrode parts 52 and 52, one inner electrode part 52 is provided with a curved part 520. The pair of inner electrode parts 52 and 52 is integrally connected to one side and the other side of the connection part 54 in its longitudinal direction (X-axis direction).

Among the inner electrode parts 52 and 52, the inner electrode part 52 located on one side in the X-axis direction is inserted into the accommodation recess 62b of the insulation case 60_1 and is contacted with and electrically connected to the second terminal electrode 24 of the capacitor chip 20b accommodated in the accommodation recess 62b, and the inner electrode part 52 located on the other side in the X-axis direction is inserted into the accommodation recess 62b of the insulation case 60_2 and is contacted with and electrically connected to the second terminal electrode 24 of the capacitor chip 20b accommodated in the accommodation recess 62b. Furthermore, the terminal electrodes 24 and 24 of the capacitor chips 20b and 20b are electrically connected with the connection part 54.

The first connection metal terminal 50a is attached over the insulation case 60_1 and the insulation case 60_2 with the connection part 54. The connection part 54 is disposed over the opening edge surfaces 66 of the insulation cases 60_1 and 60_2. Thus, the insulation case 60_1 and the insulation case 60_2 are connected (jointed) with the first connection metal terminal 50a.

The second connection metal terminal 50b is different from the first connection metal terminal 50a in that the connection part 54 is bent in a substantially L shape. In addition, the second connection metal terminal 50b is different from the first connection metal terminal 50a in that the pair of inner electrode parts 52 is integrally connected with the side of the connection part 54 perpendicular to its longitudinal direction. Among the pair of inner electrode parts 52 and 52, one inner electrode part 52 having a surface parallel to the YZ plane is provided with the curved part 520, and the other inner electrode part 52 having a surface parallel to the XZ plane is not provided with the curved part 520.

Among the inner electrode parts 52 and 52, one inner electrode part 52 mentioned above is inserted into the accommodation recess 62a of the insulation case 60_1 and is contacted with and electrically connected to the second terminal electrode 24 of the capacitor chip 20a accommodated in the accommodation recess 62a, and the other inner electrode part 52 mentioned above is inserted into the accommodation recess 62b of the insulation case 60_3 and is contacted with and electrically connected to the second terminal electrode 24 of the capacitor chip 20b accommodated in the accommodation recess 62b. Furthermore, the terminal electrodes 24 and 24 of the capacitor chips 20a and 20b are electrically connected with the connection part 54.

The second connection metal terminal 50b is attached over the insulation case 60_1 and the insulation case 60_3 with the connection part 54. The connection part 54 is disposed over the opening edge surfaces 66 of the insulation cases 60_1 and 60_3. Thus, the insulation case 60_1 and the insulation case 60_3 are connected (jointed) with the second connection metal terminal 50b.

Since the insulation cases 60_1 to 60_3 are connected to each other with the connection metal terminals 50a and 50b, the connected insulation cases 60_1 to 60_3 can be fixed to the installation portion 80 altogether at the time of fixing them to the installation portion 80 with the fixation part (the case-side fixation part 67 and the terminal-side fixation part 36). Incidentally, as shown in FIG. 1B, the insulation cases 60_1 to 60_3 are fixed to the installation portion 80 with the fasteners 90 while the insulation cases 60_1 to 60_3 on the opening edge surface 66 side are in contact with the installation portion 80 (while the bottom wall 63 side is facing opposite to the installation portion 80).

As shown in FIG. 1A, the capacitor chips 20a and 20b accommodated in the accommodation recesses 62a and 62b of the insulation cases 60_1 to 60_3 are connected in series with the metal terminals 30a, 30b, 40a, 40b, 50a, and 50b (hereinafter, referred to as the metal terminals 30, 40, and 50). In addition, among the five capacitors 20a and 20b connected in series, the capacitor chips 20a and 20b located on both ends are electrically connected with the individual metal terminals 30a and 30b and the fasteners 90. Since the installation portion 80 functions as the ground, these capacitor chips 20a and 20b can be connected to the ground. Incidentally, only either of these capacitor chips 20a and 20b may be connected to the ground.

Hereinafter, a method of manufacturing the electronic device 10 is explained.

The capacitor chips 20a and 20b are manufactured by a normal method of manufacturing multilayer ceramic capacitors.

In the manufacture of the individual metal terminals 30a and 30b, a flat metal plate is initially prepared. The metal plate is made of any conductive metal material, such as iron, nickel, copper, silver, and an alloy containing them. Next, the metal plate is machined to obtain an intermediate member having the shapes of the inner electrode part 32, the opening edge electrode part 34, and the terminal-side fixation part 36.

Next, the individual metal terminals 30a and 30b are obtained by forming a metal film by plating on the surface of the intermediate member formed by machining. Any material, such as Ni, Sn, and Cu, is used for plating. In the manufacture of the individual metal terminals 30a and 30b, the individual metal terminals 30a and 30b may be formed from a strip-shaped continuous metal plate while being connected to each other. The common metal terminals 40a and 40b and the connection metal terminals 50a and 50b can also be manufactured by the above-mentioned method.

Incidentally, the metal terminals 30, 40, and 50 may be conductive terminals made of a conductive material other than metal.

As shown in FIG. 1A and FIG. 1B, the insulation cases 60_1 to 60_3 are connected to each other by engaging the pair of engagement protrusions 690 and 690 formed on the outer surface 61c of the insulation case 60_1 with the engagement recess 691 formed on the outer surface 61c of the insulation case 60_2 and also engaging the pair of engagement protrusions 690 and 690 formed on the outer surface 61d of the insulation case 60_1 with the engagement recess 691 formed on the outer surface 61b of the insulation case 60_3.

After that, the metal terminals 30, 40, and 50 are attached to the connected insulation cases 60_1 to 60_3. In this situation, the individual metal terminal 30a (30b) is disposed so that the terminal opening part 361 of the terminal-side fixation part 36 and the case opening part 671 of the case-side fixation part 67 of the insulation case 60_2 (60_3) overlap with each other. Then, the capacitor chip 20a and/or the capacitor chip 20b are/is accommodated into the accommodation recess 62a (62b) of each of the insulation cases 60_1 to 60_3.

Next, the bolt 91 with the washer 93 is inserted into the case opening part 671, the terminal opening part 361, and the opening part of the installation portion 80, and the leg of the bolt 91 is fixed with the nut 92. It is accordingly possible to obtain the electronic device 10 including a connected body of the insulation cases 60_1 to 60_3 fixed to the installation portion 80 with the fasteners 90.

The electronic device 10 according to the present embodiment includes the case-side fixation part 67 and the terminal-side fixation part 36 for fixing the insulation case 60_2 (60_3) to the installation portion 80 (hereinafter, referred to as a "fixation part" if they do not need to be distinguished from each other). Thus, the insulation case 60_2 (60_3) can be fixed at a desired position based on a fixation position of the fixation part with a simple operation of only fixing the fixation part to the installation portion 80. Thus, the electronic device 10 according to the present embodiment can easily be fixed at a desired position of the installation portion 80.

In the present embodiment, the insulation case 60_2 (60_3) is fixed to the installation portion 80 with the fastener 90 in the fixation part. In this case, the insulation case 60_2 (60_3) is fixed to the installation portion 80 only by fixing the fixation part to the installation portion 80 with the fastener 90, and the electronic device 10 can thereby easily be fixed at a desired position of the installation portion 80. In addition, the electronic device 10 can be fixed to the installation portion 80 with the fastener 90 without using solder, conductive adhesives, or the like.

In the present embodiment, the fixation part is disposed outside the outer wall 61_2 (61_3) forming the accommodation recess 62a (62b). Since the fixation part is fixed to the installation portion 80 using the outside space of the outer wall 61_2 (61_3), it is possible to improve the workability for fixing the fixation part to the installation portion 80 and to easily fix the electronic device 10 at a desired position of the installation portion 80.

In the present embodiment, the fixation part (terminal-side fixation part 36) is provided to form a part of the individual metal terminal 30a (30b). Since the individual metal terminal 30a (30b) is partly utilized for the fixation part, it is possible to prevent an increase in the number of parts due to the installation of the fixation part and to simplify the structure of the electronic device 10.

In the present embodiment, the individual metal terminal 30a (30b) includes the terminal side part 360, and the terminal opening part 361 is formed in the terminal side part 360. In this case, the fixation part can be fixed to the installation portion 80 with a simple operation of, for example, inserting the fastener 90 into the terminal opening part 361. Thus, the electronic device 10 can easily be fixed at a desired position of the installation portion 80.

In the present embodiment, the fixation part (case-side fixation part 67) is provided to form a part of the insulation case 60_2 (60_3). Since the insulation case 60_2 (60_3) is partly utilized for the fixation part, it is possible to prevent an increase in the number of parts due to the installation of the fixation part and to simplify the structure of the electronic device 10.

In the present embodiment, the insulation case 60_2 (60_3) includes the case side part 670, and the case opening part 671 is formed in the case side part 670. In this case, the fixation part can be fixed to the installation portion 80 with a simple operation of, for example, inserting the fastener 90 into the case opening part 671. Thus, the electronic device 10 can easily be fixed at a desired position of the installation portion 80.

In the present embodiment, the individual metal terminal 30a (30b) is fixed to the installation portion 80 with the insulation case 60_2 (60_3). In this case, the insulation case 60_2 (60_3) can directly be fixed to the installation portion 80 in the fixation part (case-side fixation part 67) and can stably be fixed to the installation portion 80.

In the present embodiment, the installation portion 80 is made of a conductor. In the present embodiment, since the fastener 90 is made of a conductor, for example, the individual metal terminal 30a (30b) and the installation portion 80 can electrically be connected to each other with the fastener 90 at the time of fixing the fixation part (terminal-side fixation part 36) formed by a part of the individual metal terminal 30a (30b) to the installation portion 80. Thus, the capacitor chip 20a (20b) connected to the individual metal terminal 30a (30b) can be connected to the ground.

In the present embodiment, the engagement groove 660 is formed along the periphery of the accommodation recess 62a (62b) in the insulation case 60_1. Since the end (side electrode part 46) of the common metal terminal 40a is engaged with the engagement groove 660, the common metal terminal 40a can stably be fixed to the insulation case 60_1.

In the present embodiment, the electronic device 10 includes the connection part 69 connecting a plurality of insulation cases 60_1 to 60_3. Since the plurality of insulation cases 60_1 to 60_3 is connected to each other with the connection part 69, a combined body of a plurality of electronic devices 10 can be structured. Thus, in addition to being able to handle a plurality of electronic devices 10 as a unit, the user can optimize the configuration for easy-to-use form for themselves by making an adjustment of, for example, increasing or decreasing the number of connected insulation cases 60_1 to 60_3 based on the usage situation.

Second Embodiment

An electronic device 10A according to the embodiment shown in FIG. 5A to FIG. 8 has the same structure as the electronic device 10 according to First Embodiment except for the following matters and exhibits the same effect. In FIG. 5A to FIG. 8, common members with the electronic device 10 according to First Embodiment are given common references and are not partly explained.

The electronic device 10A is different from the electronic device 10 according to First Embodiment in that the electronic device 10A includes an insulation case 60A_2, a second individual metal terminal 30bA, and a third connection metal terminal 50c. As is clear from the comparison between FIG. 6 and FIG. 2C, the insulation case 60A_2 is different from the insulation case 60_2 according to First Embodiment in that the engagement groove 660 of the insulation case 60A_2 is formed in a boundary between the opening edge surface 66 and the case side part 670. That is, in the present embodiment, two engagement grooves 660 extend in parallel in the Y-axis direction on the opening edge surface 66. The engagement grooves 660 formed at a predetermined interval in the X-axis direction have the same shape.

Figure 5A:
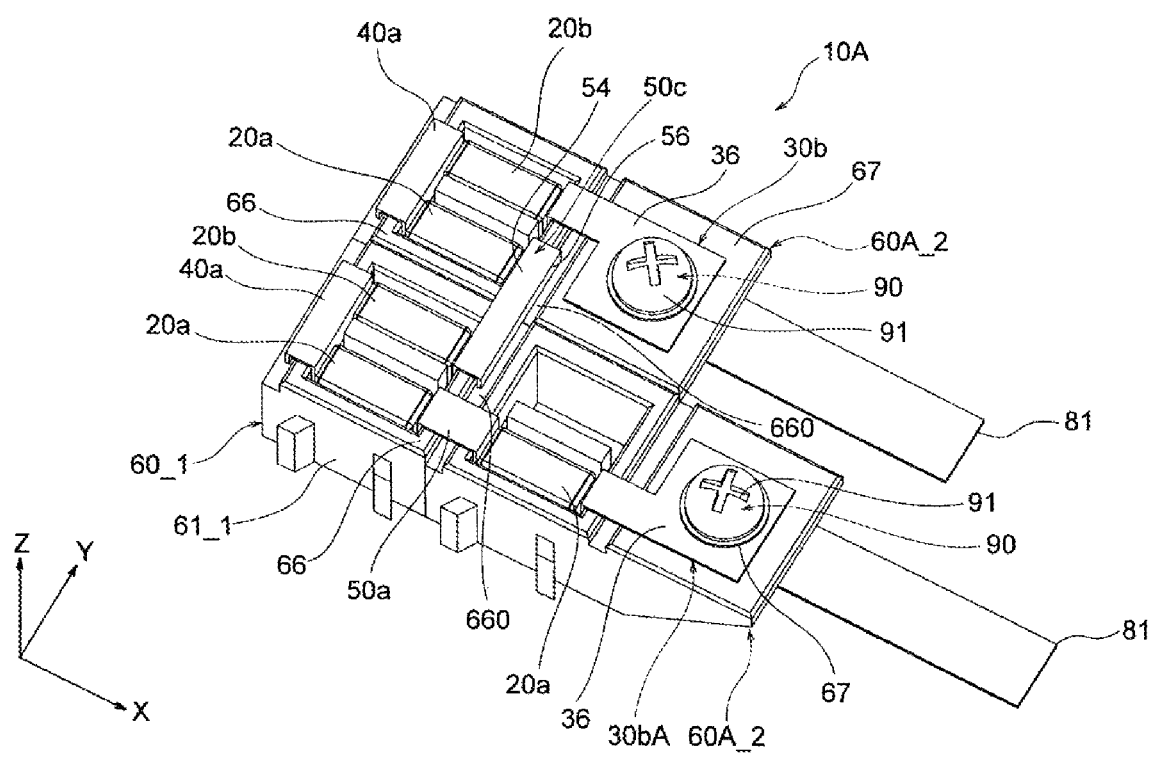
FIG. 5A is a perspective view of an electronic device according to Second Embodiment of the present invention.
Figure 5B:
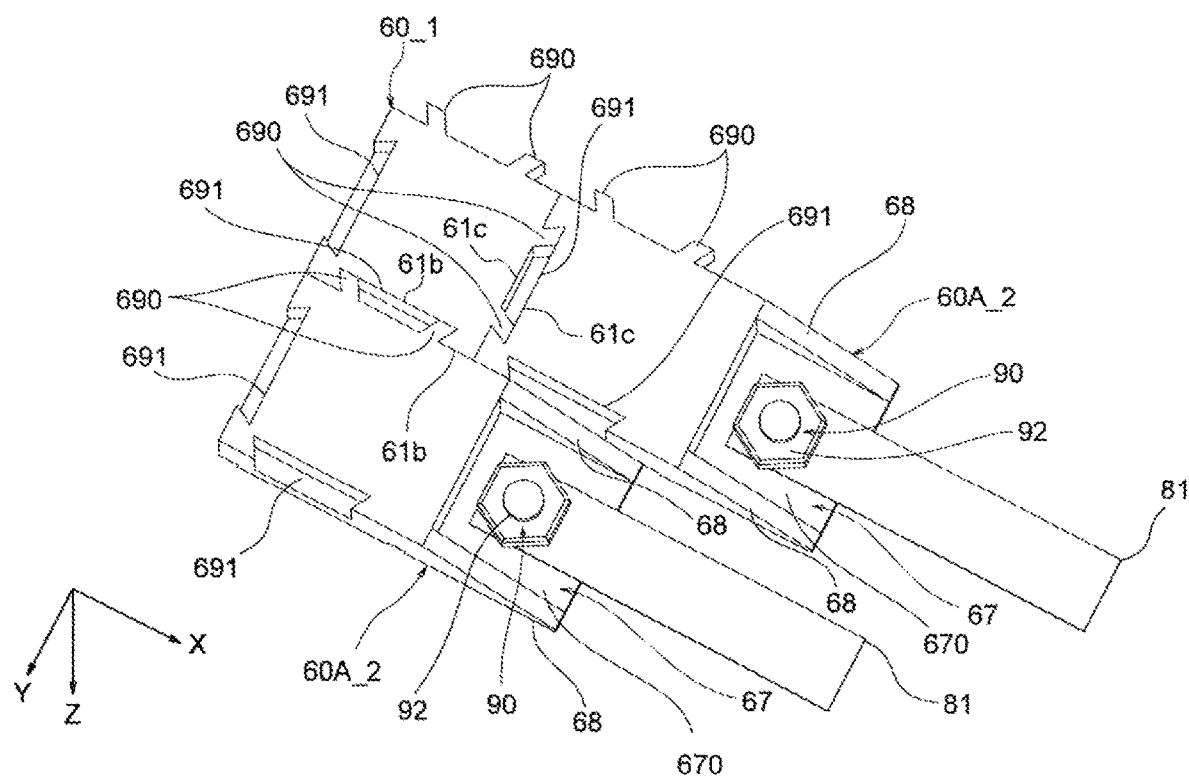
FIG. 5B is a perspective view of the electronic device shown in FIG. 5A when viewed from below.
Figure 5C:
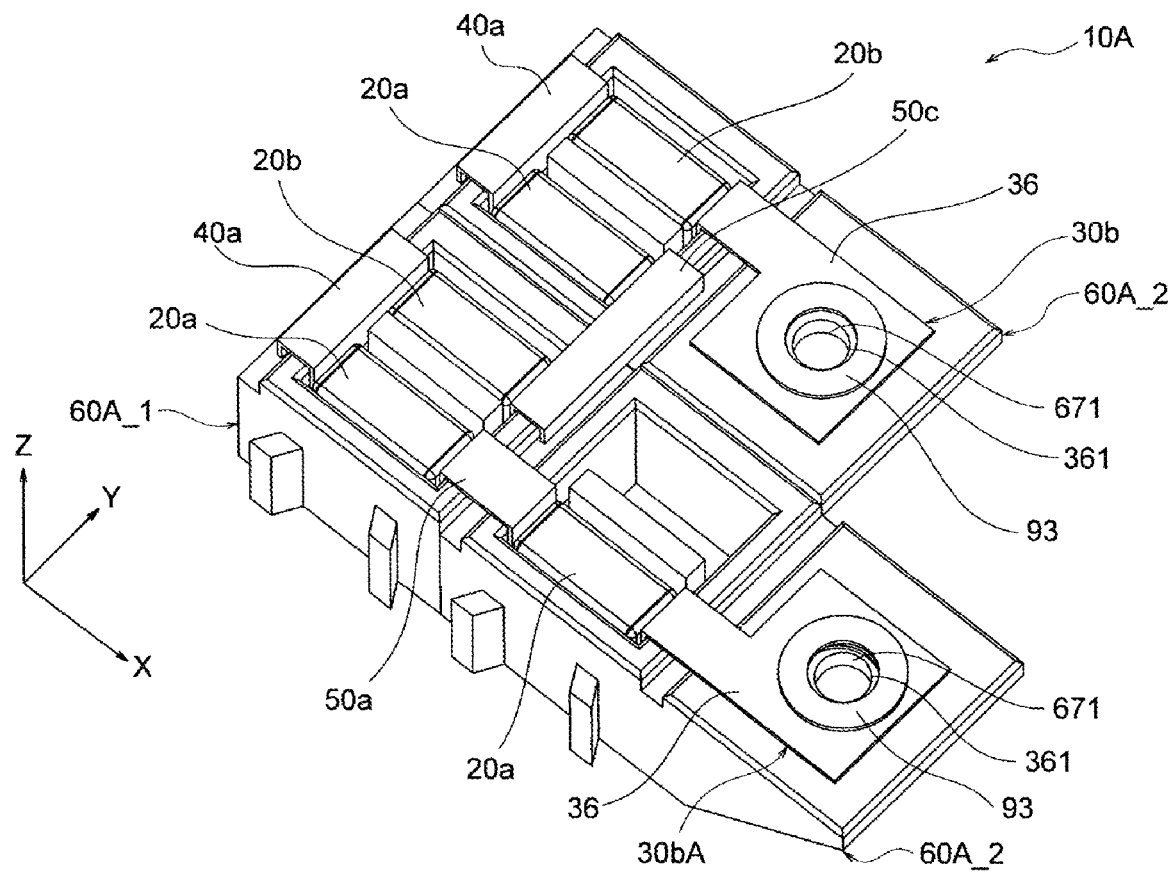
FIG. 5C is a perspective view when fasteners are removed from the electronic device shown in FIG. 5A.
Figure 6:
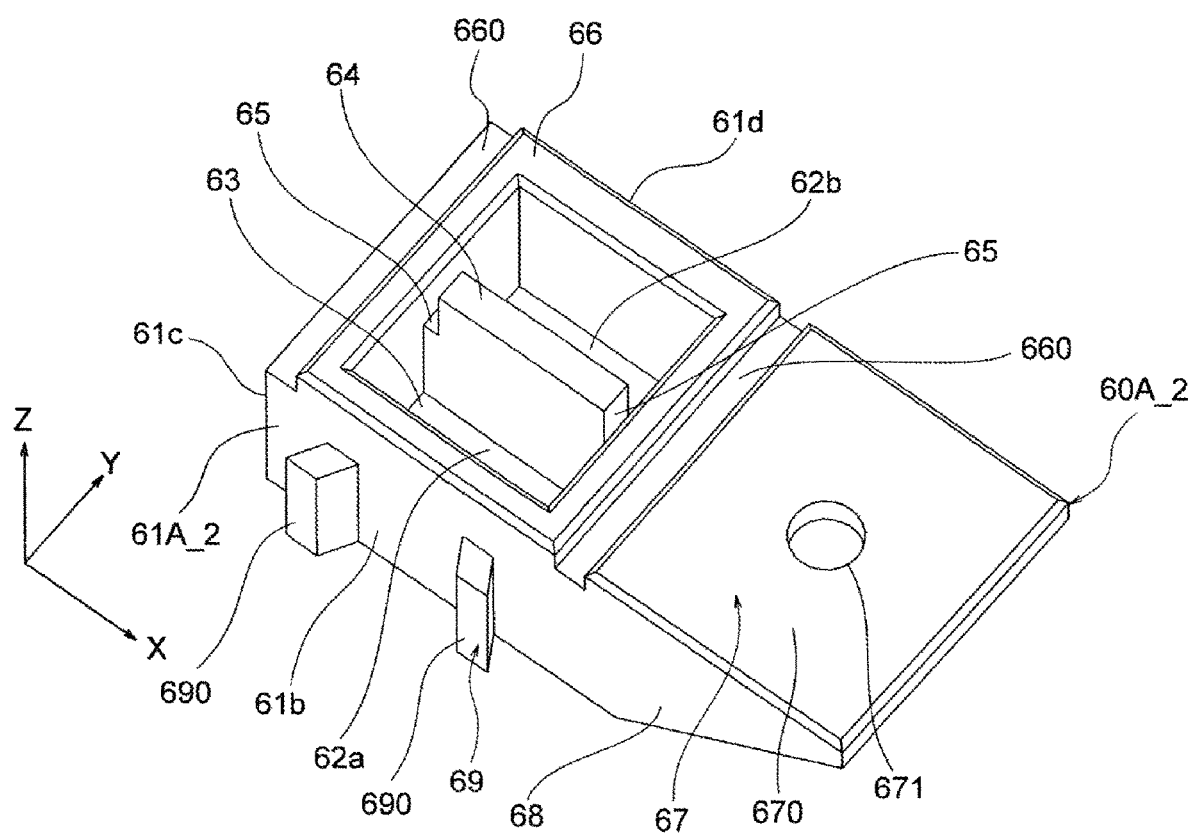
FIG. 6 is a perspective view illustrating one of a plurality of cases shown in FIG. 5A.

As shown in FIG. 5C, the second individual metal terminal 30bA is structured in mirror symmetry manner to the second individual metal terminal 30b. The other structure of the second individual metal terminal 30bA is similar to that of the second individual metal terminal 30b.

As shown in FIG. 7, the third connection metal terminal 50c includes a pair of inner electrode parts 52 and 52, a connection part 54 connecting (jointing) the pair of inner electrode parts 52 and 52, and a side electrode part 56. The pair of inner electrode parts 52 and 52 is integrally connected at a predetermined interval on one end and the other end of the connection part 54 in the Y-axis direction, respectively. As shown in FIG. 5A, the side electrode part 56 continues to the connection part 54 and is formed along an outer surface (outside wall) of the outer wall 61_1 of the insulation case 60_1 or along the engagement grooves 660 of the two insulation cases 60A_2 and 60A_2.

The third connection metal terminal 50c is attached over the insulation case 60_1 and the insulation case 60A_2 with the connection part 54. The connection part 54 is disposed over the opening edge surfaces 66 of the insulation case 60_1 and the insulation case 60A_2. This allows the insulation case 60_1 and the insulation case 60A_2 to be connected (jointed) with the third connection metal terminal 50c.

As shown in FIG. 5A and FIG. 5B, the insulation cases 60_1 to 60_3 are connected to each other by engaging the pair of engagement protrusions 690 and 690 formed on the outer surface 61c of the insulation case 60_1 with the engagement recess 691 formed on the outer surface 61c of one insulation case 60A_2 and also engaging the pair of engagement protrusions 690 and 690 formed on the outer surface 61b of the other insulation case 60A_2 with the engagement recess 691 formed on the outer surface 61b of the other insulation case 60A_2.

In the present embodiment, the case-side fixation part 67 of the insulation case 60A_2 and the terminal-side fixation part 36 of the second individual metal terminal 30b are fixed to the bus bar 81 (installation portion 80) with the fastener 90. The bus bar 81 has a flat plate shape and is made of a conductive plate (metal plate or so).

As shown in FIG. 5A to FIG. 5C, each of the fasteners 90 is inserted from the front surface side of the case-side fixation part 67 into the case opening part 671 and the terminal opening part 361, and the leg of the bolt 91 is fixed by the nut 92 as shown in FIG. 7 on the back surface of the case-side fixation part 67. This allows the insulation case 60A_2 to be fixed to the bus bar 81 with the fastener 90.

The capacitor chips 20a and 20b accommodated in the accommodation recesses 62a and 62b of each of the two insulation cases 60A_2 and 60A_2 and the capacitor chips 20a and 20b accommodated in the accommodation recesses 62a and 62b of the insulation case 60_1 are connected in series with the second individual metal terminals 30b and 30bA, the two first common metal terminals 40a and 40a, and the connection metal terminals 50a and 50c.

Among the five capacitor chips 20a and 20b connected in series, the capacitor chips 20a and 20b located on both ends are electrically connected to the bus bar 81 with the second individual metal terminals 30b and 30bA. Since either of the two bus bars 81 functions as the ground, either of these capacitor chips 20a and 20b can be connected to the ground.

Figure 8:
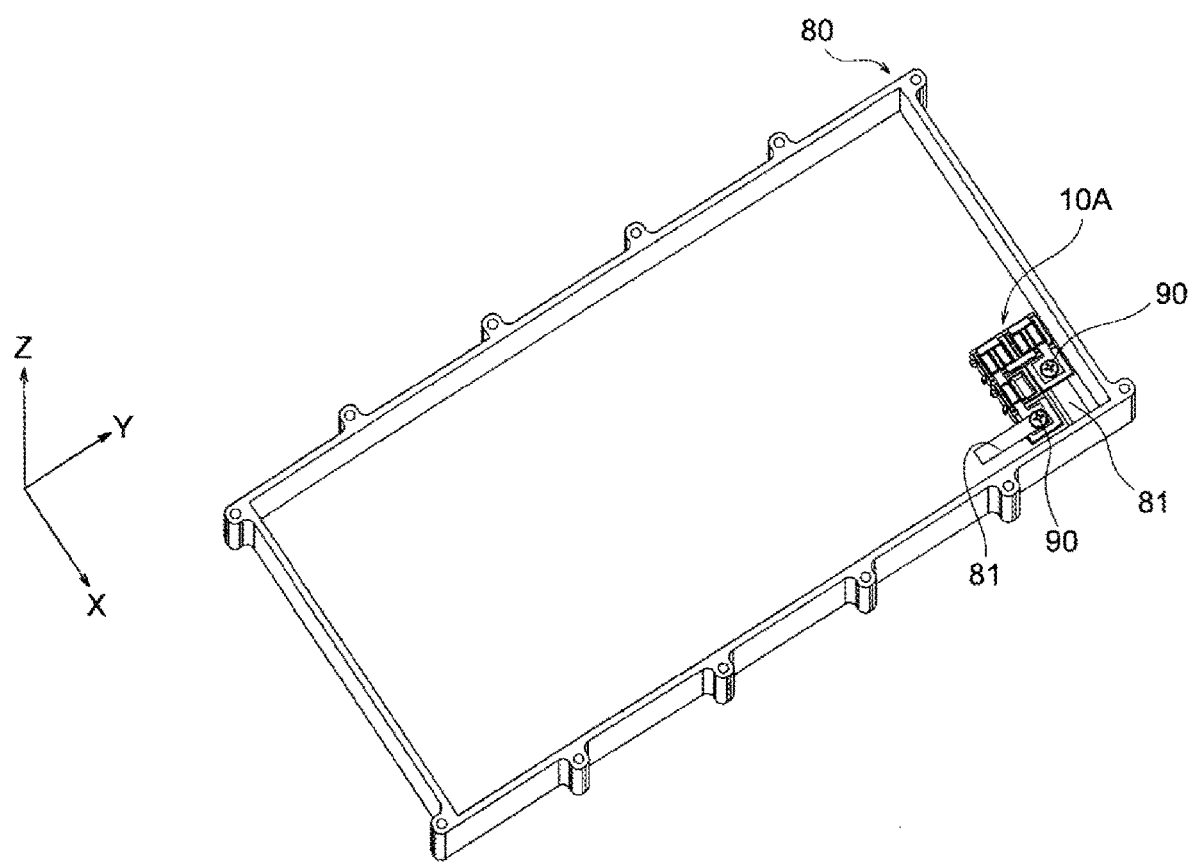
FIG. 8 is a perspective view illustrating a state where the electronic device shown in FIG. 5A is fixed to an installation portion.

The electronic device 10A is incorporated and fixed inside the installation portion 80 in the manner as shown in FIG. 8. In the illustrated example, the installation portion 80 is a case or housing for accommodating the electronic device 10A (for example, a housing of an apparatus into which the electronic device 10A is incorporated). Incidentally, the bus bars 81 are fixed to the installation portion 80 by fixation means.

Like the present embodiment, the type of the metal terminals or the insulation cases may appropriately be changed for configuration of the electronic device 10A. Even in such a case, the same effects as those of First Embodiment can be obtained.

Third Embodiment

Figure 9:
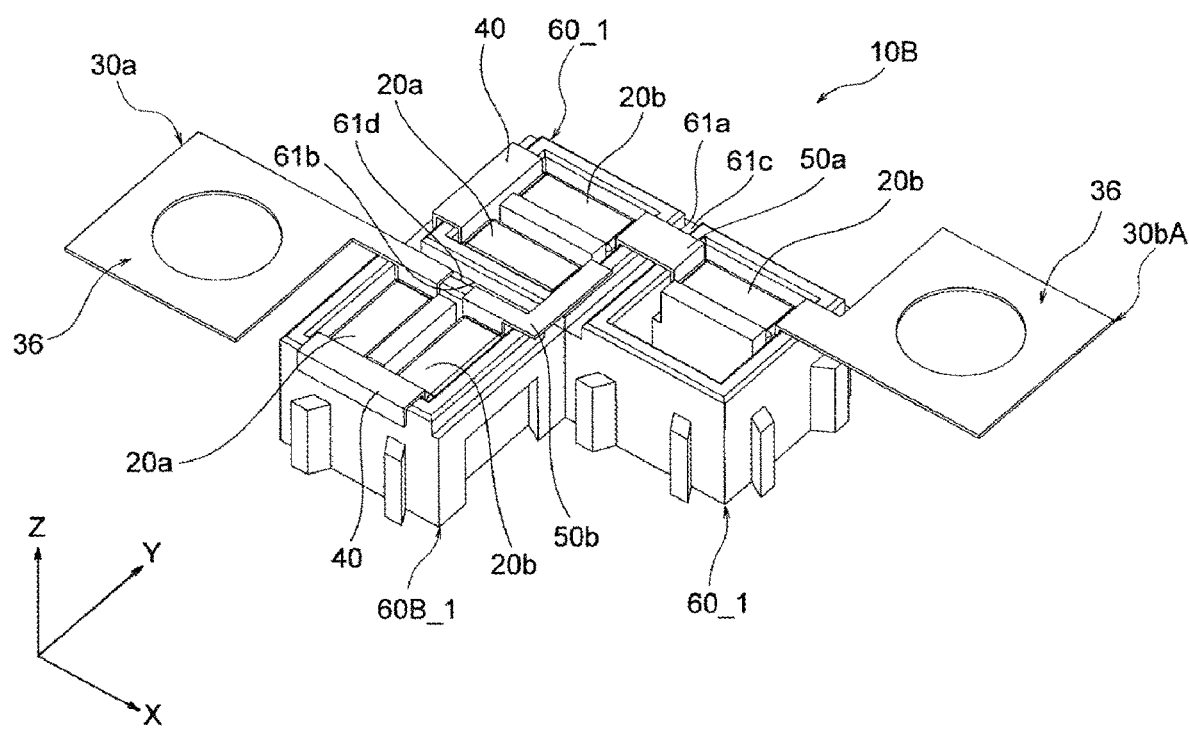
FIG. 9 is a perspective view of an electronic device according to Third Embodiment of the present invention.
Figure 10A:
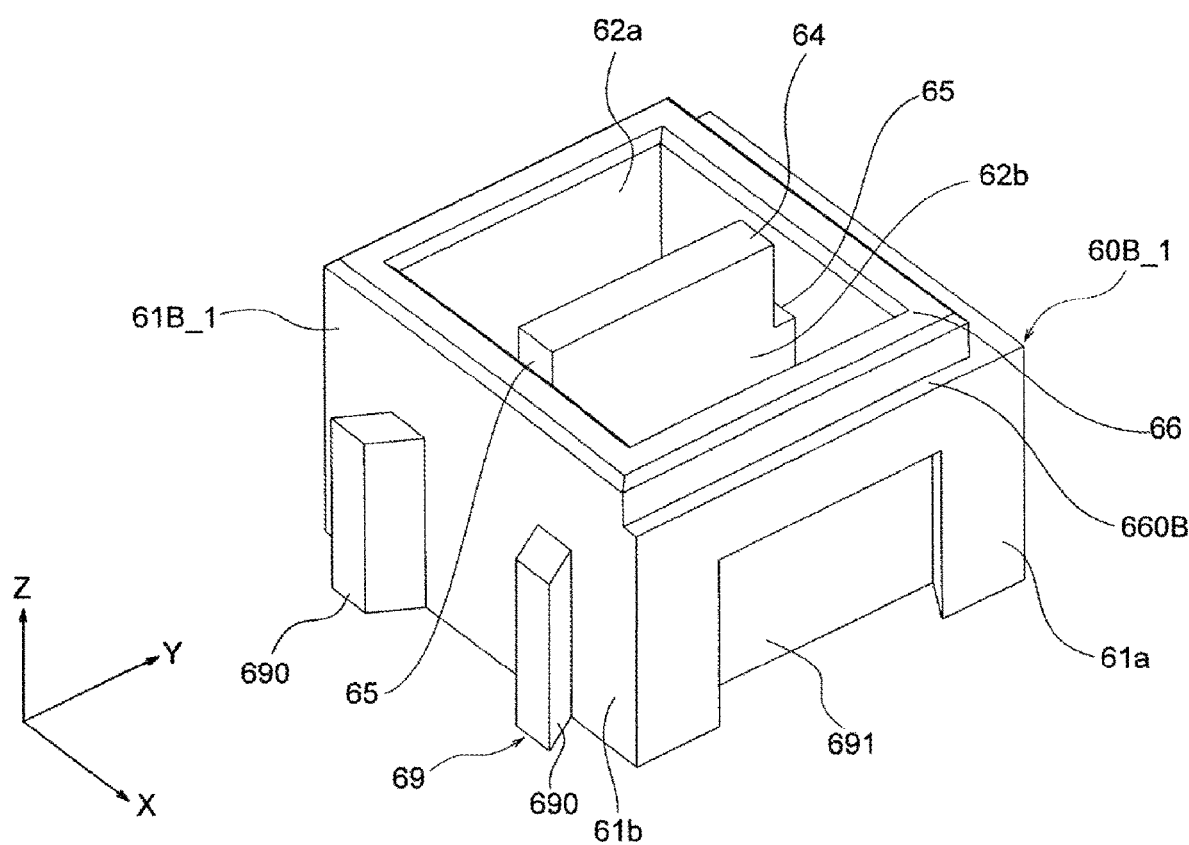
FIG. 10A is a perspective view illustrating one of a plurality of cases shown in FIG. 9.
Figure 10B:
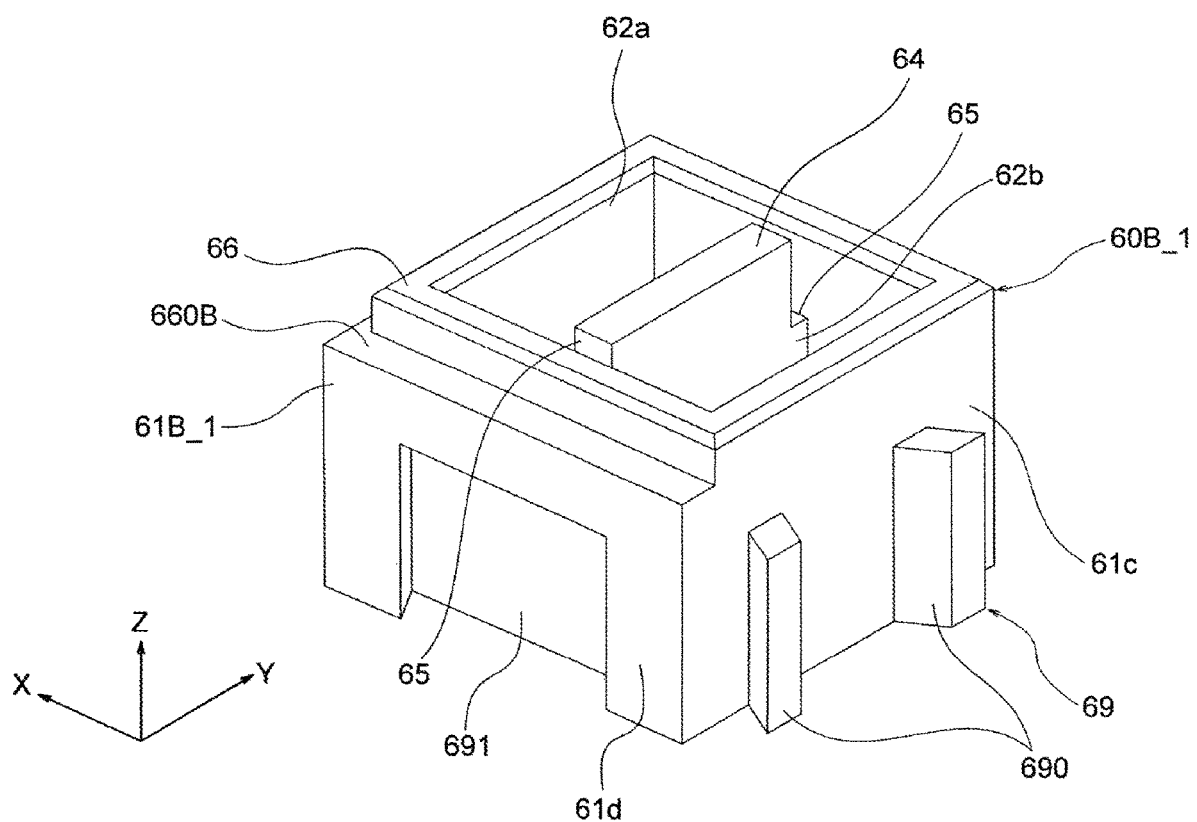
FIG. 10B is a perspective view of the case shown in FIG. 10A when rotated around the Z-axis (rotation axis) by 180 degrees.
Figure 11:
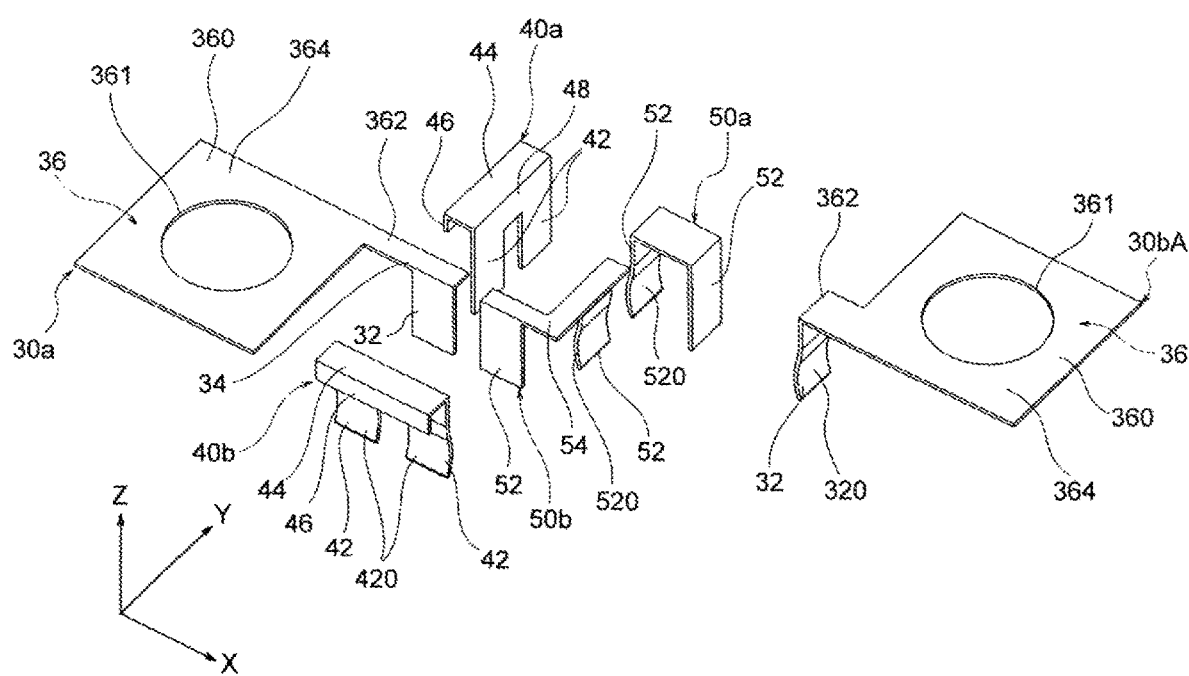
FIG. 11 is a perspective view of the conductive terminal shown in FIG. 9.

An electronic device 10B according to the embodiment shown in FIG. 9 to FIG. 11 has the same structure as the electronic device 10 according to First Embodiment except for the following matters and exhibits the same effect. In FIG. 9 to FIG. 11, common members with the electronic device 10 according to First Embodiment are given common references and are not partly explained. Incidentally, the installation portion 80 is not illustrated in FIG. 9.

The electronic device 10B includes a connected body of two insulation cases 60_1 and 60_1 and an insulation case 60B_1. As shown in FIG. 10A and FIG. 10B, the insulation case 60B_1 includes an engagement groove 660B. The engagement groove 660B is formed over the outer surface 61a side to the outer surface 61d side along the opening edge surface 66. Thus, the engagement groove 660B has a substantially L shape.

As shown in FIG. 9, the insulation cases 60_1, 60_1, and 60B_1 are connected to each other by engaging the pair of engagement protrusions 690 and 690 (see FIG. 2B) formed on the outer surface 61c of one insulation case 60_1 with the engagement recess 691 (see FIG. 2A) formed on the outer surface 61a of the other insulation case 60_1 and also engaging the engagement recess 691 formed on the outer surface 61d of the insulation case 60B_1 (see FIG. 10B) with the engagement recess 691 (see FIG. 2A) formed on the outer surface 61b of the insulation case 60_1.

In the illustrated example, the sizes of the terminal-side fixation parts 36 of the first individual metal terminal 30a and the second individual metal terminal 30bA are larger than those of the terminal-side fixation parts 36 of the first individual metal terminal 30a shown in FIG. 1A and the second individual metal terminal 30bA shown in FIG. 5A, but may be the same as those of the terminal-side fixation part 36 of the first individual metal terminal 30a shown in FIG. 1A and the second individual metal terminal 30bA shown in FIG. 5A.

In the present embodiment, the terminal-side fixation parts 36 of the first individual metal terminal 30a and the second individual metal terminal 30bA are directly fixed to the installation portion 80 (e.g., the bus bar 81 shown in FIG. 5A) with the fasteners 90. For more detail, the terminal opening part 361 of the first individual metal terminal 30a and the terminal opening part 361 of the second individual metal terminal 30bA shown in FIG. 11 are arranged to overlap with the opening part of the installation portion 80, and the fasteners 90 (see FIG. 5A) are inserted into the terminal opening parts 361. Thus, the terminal-side fixation parts 36 of the first individual metal terminal 30a and the second individual metal terminal 30bA are fixed to the installation portion 80, and a connected body of the insulation cases 60_1, 60_1, and 60B_1 shown in FIG. 9 is fixed to the installation portion 80 with the first individual metal terminal 30a and the second individual metal terminal 30bA.

The same effects as those of First Embodiment can also be obtained in the present embodiment. In addition, the individual metal terminals 30a and 30bA are directly fixed to the installation portion 80 in the fixation part (terminal-side fixation part 36) in the present embodiment. In this case, since the insulation cases 60_1, 60_1, and 60B_1 can be fixed to the installation portion 80 with the individual metal terminals 30a and 30bA in the fixation part (terminal-side fixation part 36), the case side part 670 does not need to be disposed in the insulation case 60_1 or 60B_1, and the structure of the insulation cases 60_1 and 60B_1 can be simplified.

Fourth Embodiment

Figure 12A:
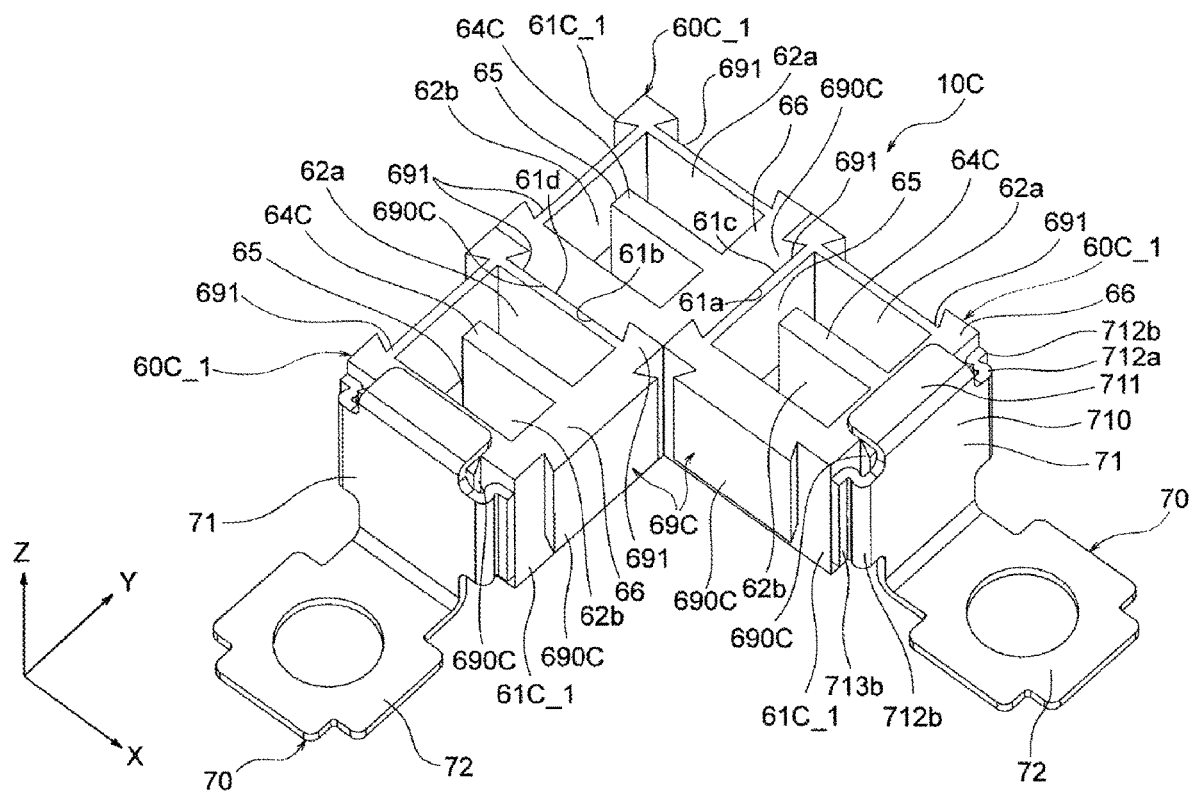
FIG. 12A is a perspective view of an electronic device according to Fourth Embodiment of the present invention.
Figure 12B:
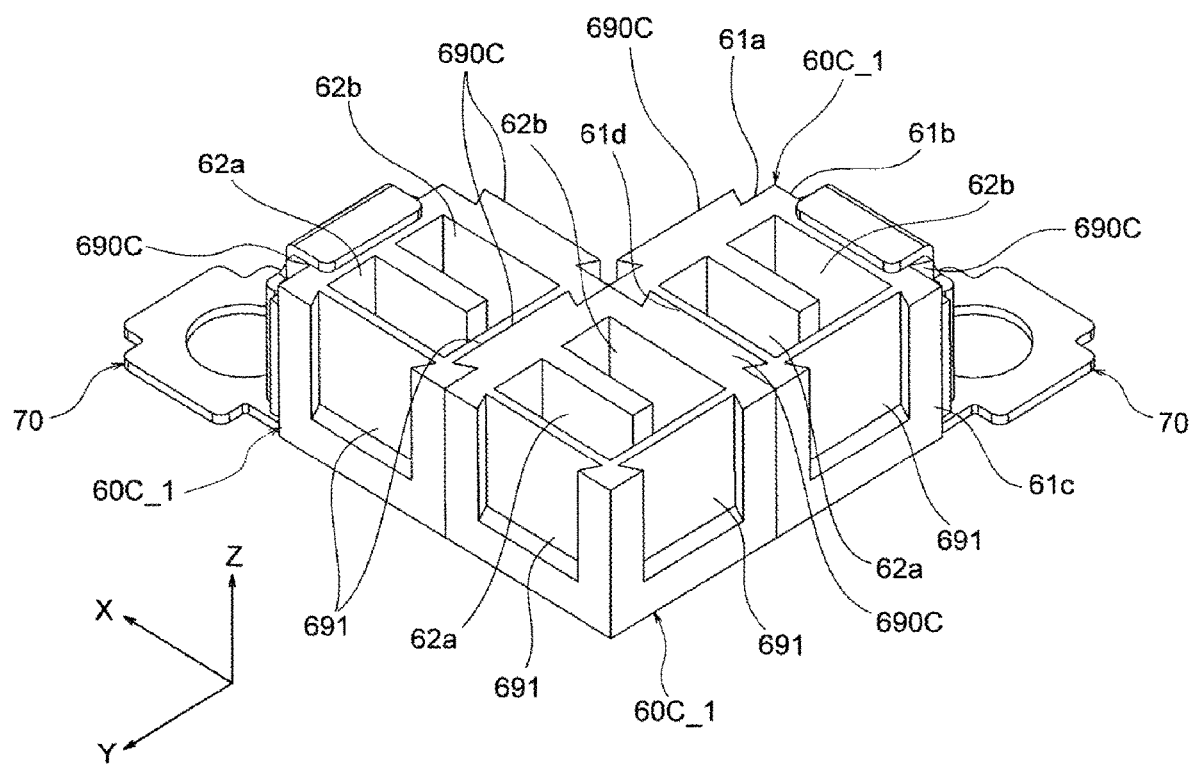
FIG. 12B is a perspective view of the electronic device shown in FIG. 12A when rotated around the Z-axis (rotation axis) by 180 degrees.
Figure 13:
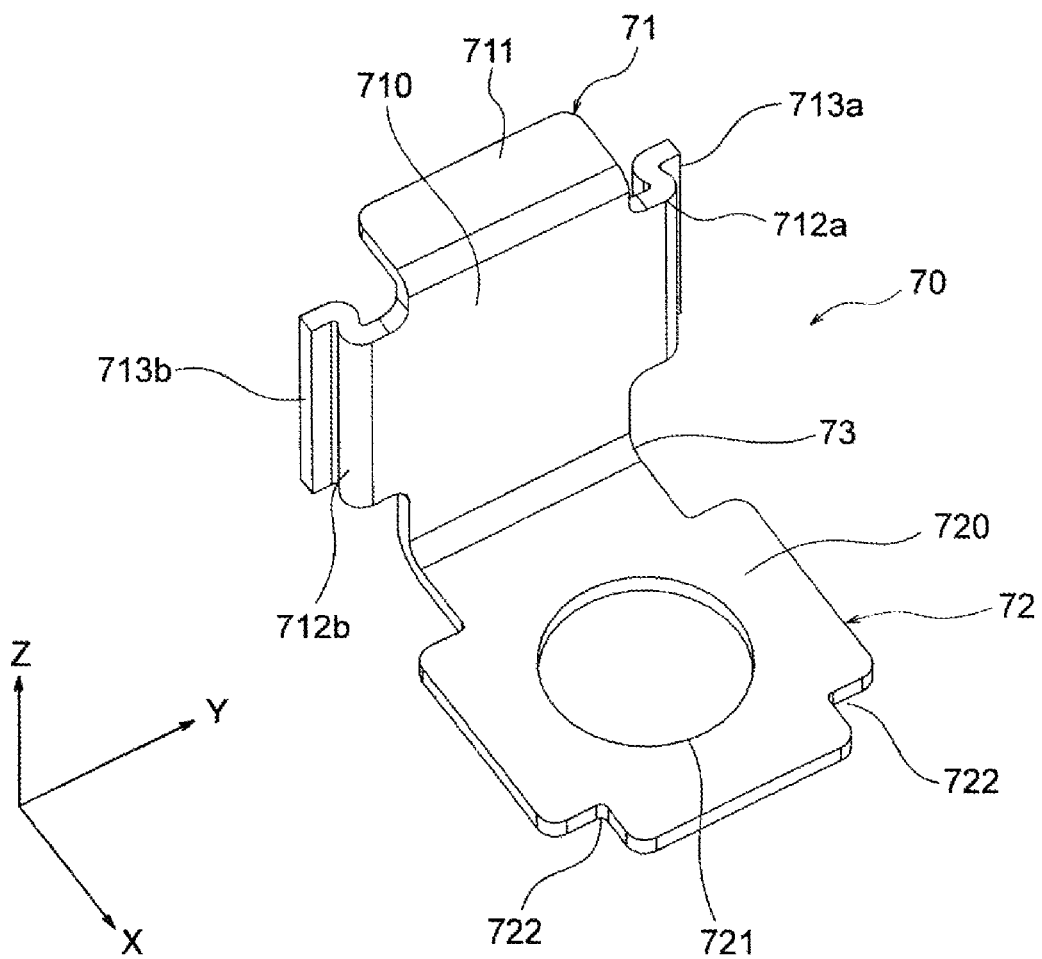
FIG. 13 is a perspective view of conductive terminals shown in FIG. 12A.

An electronic device 10C according to the embodiment shown in FIG. 12A to FIG. 13 has the same structure as the electronic device 10B according to Third Embodiment except for the following matters and exhibits the same effect. In FIG. 12A to FIG. 13, common members with the electronic device 10B according to Third Embodiment are given common references and are not partly explained. Incidentally, the capacitor chips 20a and 20b and the metal terminals are not illustrated in FIG. 12A or FIG. 12B, but the capacitor chips 20a and 20b and the metal terminals are actually arranged (excluding the individual metal terminals 30a and 30bA) as with the example of FIG. 9. The installation portion 80 is not illustrated in FIG. 12A or FIG. 12B.

As shown in FIG. 12A and FIG. 12B, the electronic device 10C includes three insulation cases 60C_1 and two fixation metal terminals 70. As is clear from the comparison between FIGS. 12A and 12B and FIGS. 2A and 2B, the insulation case 60C_1 is different from the insulation case 60_1 in that the insulation case 60C_1 includes engagement parts 69C. Each of the engagement parts 69C includes an engagement protrusion 690C.

Each of the engagement protrusions 690C has a predetermined width in the X-axis direction or the Y-axis direction and has a shape corresponding to that of each of the engagement recesses 691. Thus, when the engagement recess 691 of one insulation case 60C_1 is engaged with the engagement protrusion 690C of the other insulation case 60C_1, the engagement protrusion 690C of the other insulation case 60C_1 engages with the engagement recess 691 of one insulation case 60C_1 with no gap.

As shown in FIG. 13, the fixation metal terminal 70 functions as a fixation part for fixing the insulation case 60C_1 to the installation portion 80 (see FIG. 1A). The fixation metal terminal 70 includes a grip part 71, a fixation part 72, and a connection part 73. The grip part 71 includes a flat plate part 710, an upper grip part 711, and a pair of side grip parts 712a and 712b. The flat plate part 710 has a flat plate shape and a substantially square surface parallel to the YZ plane. The upper grip part 711 is integrally connected to the upper end of the flat plate part 710 and extends (protrudes) toward the opposite side of where the fixation part 72 is formed (the side where the insulation case 60C_1 shown in FIG. 12A is disposed). The upper grip part 711 extends from one end to the other end of the flat plate part 710 in the Y-axis direction at the upper end of the flat plate part 710.

The pair of side grip parts 712a and 712b is integrally connected to the ends (side surfaces) of the upper grip part 711 on one side and the other side in the Y-axis direction. The side grip parts 712a and 712b extend from the upper end to the lower end of the flat plate part 710 at its ends (side surfaces) on one side and the other side.

The side grip parts 712a and 712b protrude toward the same direction as the upper grip part 711. Side protrusions 713a and 713b are formed at the tips of the side grip parts 712a and 712b. The side protrusions 713a and 713b respectively protrude (extend) toward one side and the other side in the Y-axis direction. The side protrusion 713a (713b) has a surface parallel to the YZ plane.

The fixation part 72 includes a bottom part 720, a fixation opening part 721, and two notches 722 and 722. The bottom part 720 has a flat plate shape and has a substantially square surface parallel to the XY plane. The fixation opening part 721 is formed at a substantially central area of the bottom part 720. The opening width (diameter) of the fixation opening part 72 is large enough to insert the bolt 91 (see FIG. 1A and FIG. 1B) constituting the fastener 90. The notches 722 and 722 are formed at the corners of the bottom part 720 on its tip side in the X-axis direction.

The connection part 73 connects the fixation part 72 and the grip part 71. For more detail, the connection part 73 is formed in the boundary between the flat plate part 710 and the bottom part 720 and connects the flat plate part 710 and the bottom part 720.

As shown in FIG. 12A and FIG. 12B, when the fixation metal terminal 70 is fixed to the insulation case 60C_1, the flat plate part 710 is disposed to face the engagement protrusion 690C of the insulation case 60C_1. A gap may be formed between the flat plate part 710 and the engagement protrusion 690C. Instead, the flat plate part 710 and the engagement protrusion 690C may closely be in contact with each other.

The upper grip part 711 is in contact with the upper end of the engagement protrusion 690C and the opening edge surface 66 of the insulation case 60C_1 and grips them. The side grip parts 712a and 712b grip one end and the other end of the engagement protrusion 690C in the Y-axis direction from outside. The side protrusions 713a and 713b are respectively in contact with the surface of the outer wall 61_1 located outside the engagement protrusion 690C on the outside of the side grip parts 712a and 712b.

Three insulation cases 60C_1, 60C_1, and 60C_1 are connected to each other by engaging the engagement protrusion 690C formed on the outer surface 61a of the insulation case 60C_1 located in the middle of the three insulation cases 60C_1, 60C_1, and 60C_1 with the engagement recess 691 formed on the outer surface 61c of the insulation case 60C_1 adjacent in the X-axis direction and also engaging the engagement protrusion 690C formed on the outer surface 61b of the insulation case 60C_1 located in the middle of the three insulation cases 60C_1, 60C_1, and 60C_1 with the engagement recess 691 formed on the outer surface 61d of the insulation case 60C_1 adjacent in the Y-axis direction.

In the present embodiment, the fixation metal terminals 70 and 70 are directly fixed to the installation portion 80 (see FIG. 1A) with the fasteners 90. For more detail, the fixation opening parts 721 and 721 of the fixation metal terminals 70 and 70 shown in FIG. 13 are arranged to overlap with the opening parts of the installation portion 80, and the fasteners 90 (see FIG. 1A and FIG. 1B) are inserted into the fixation opening parts 721 and 721. Thus, the fixation parts 72 and 72 of the fixation metal terminals 70 and 70 are fixed to the installation portion 80, and the three insulation cases 60C_1 are fixed to the installation portion 80 with the fixation parts 72 and 72.

The same effects as those of Third Embodiment can also be obtained in the present embodiment. In addition, the fixation parts 72 and 72 are structured separately from the metal terminals and the insulation cases 60C_1. In this case, since the metal terminals and the insulation cases 60C_1 are not provided with the fixation parts 72 and 72, the structure of the metal terminals and the insulation cases 60C_1 can be simplified.

Incidentally, the present invention is not limited to the above-mentioned embodiments and can variously be modified within the scope of the present invention.

In the above-mentioned embodiments, for example, the capacitor chips are exemplified as an example of the chip component, but the chip component may be one other than capacitor chips.

Figure 14A:
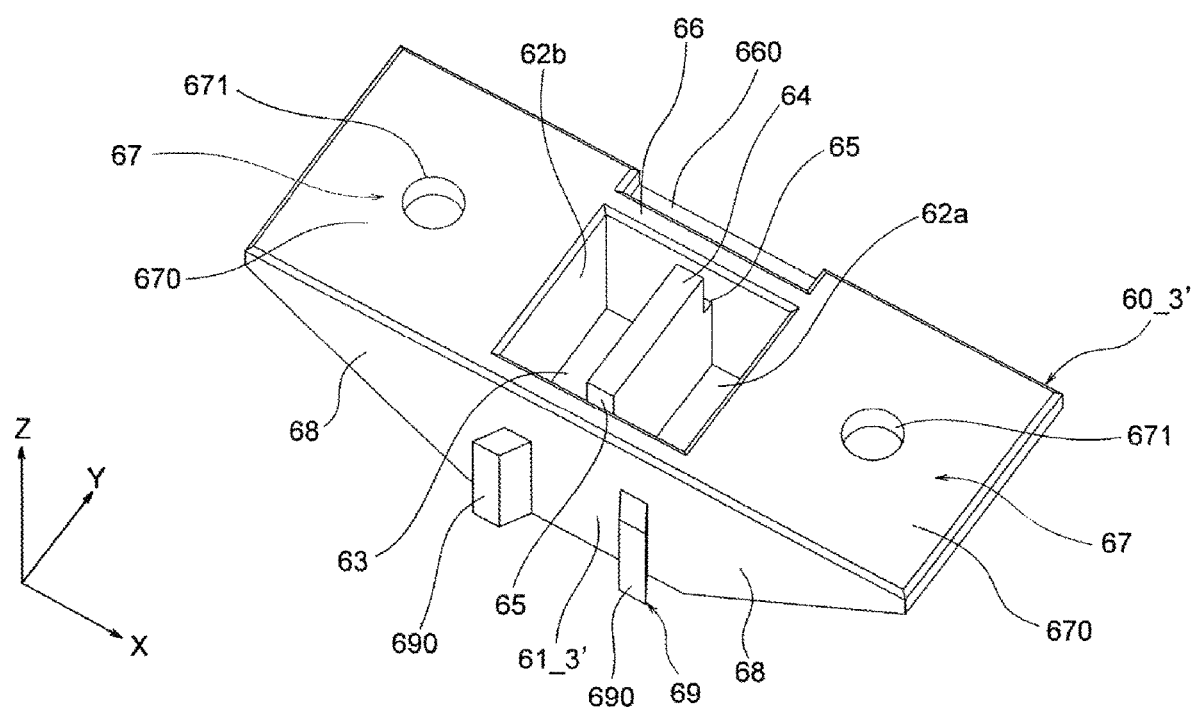
FIG. 14A is a perspective view illustrating a modified example of a case shown in FIG. 2E.
Figure 14B:
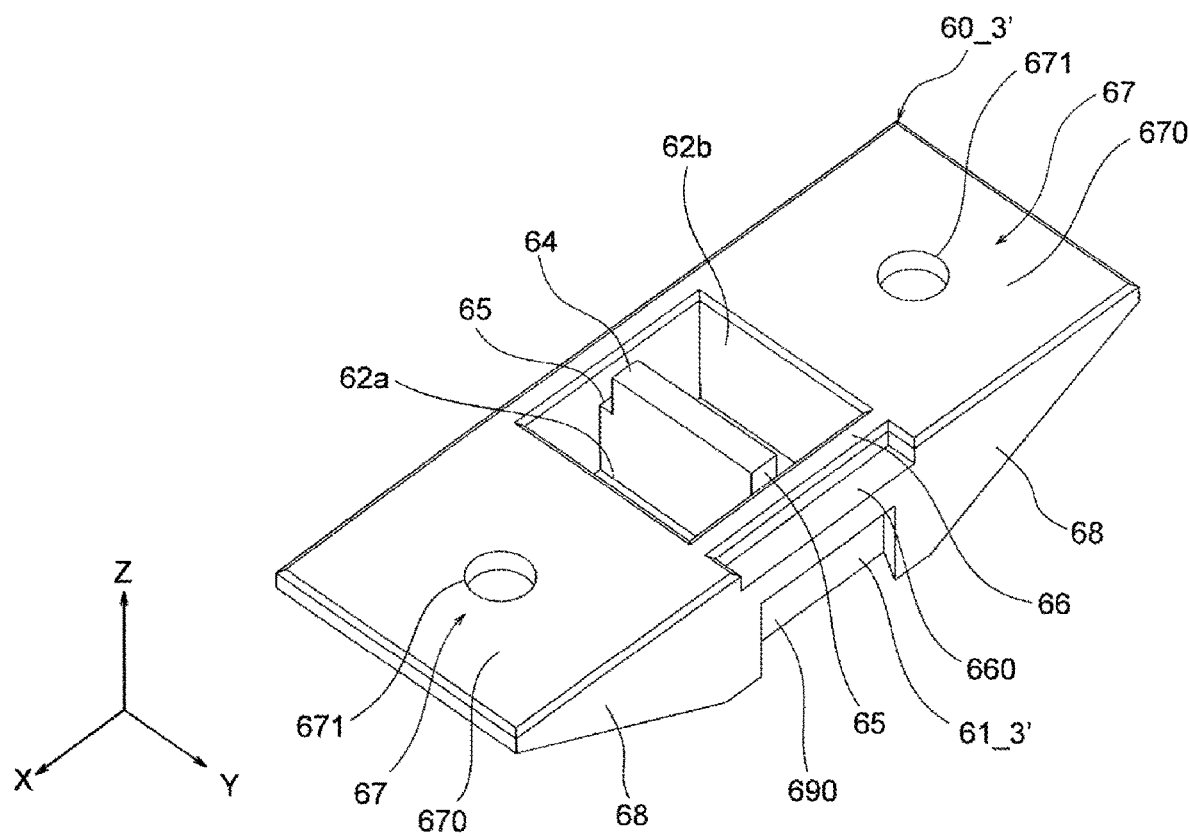
FIG. 14B is a perspective view of a case shown in FIG. 14A when rotated around the Z-axis (rotation axis) by 90 degrees.

In First Embodiment, the electronic device 10 is provided with a connected body of a plurality of insulation cases 60_1 to 60_3, but may be provided with, for example, only one insulation case 60_3' as shown in FIG. 14A and FIG. 14B.

The insulation case 60_3' includes an outer wall 61_3'. The outer wall 61_3' is provided with two case-side fixation parts 67 and the lateral wall parts 68 integrally formed on one side and the other side of each of the case-side fixation parts 67 in the Y-axis direction. Either of the case-side fixation parts 67 is formed on one side of the accommodation recesses 62a and 62b in the X-axis direction, and the other case-side fixation part 67 is formed on the other side of the accommodation recesses 62a and 62b in the X-axis direction. That is, the insulation case 60_3' is formed by providing the outer wall 61_3 of the insulation case 60_3 shown in FIG. 2E with the case-side fixation parts 67 on both sides in the X-axis direction.

The insulation case 60_3' is fixed to the installation portion 80 shown in FIG. 1A by providing each of the case-side fixation parts 67 with the first individual metal terminal 30a shown in FIG. 1A and inserting the fastener 90 into the terminal opening part 361 and the case opening part 671. This structure makes it possible to fix the insulation case 60_3' to the installation portion 80 alone.

In First Embodiment, the fastener 90 is structured by the bolt 91, the nut 92, and the washer 93, but may be structured by other member, such as tack, crimping member, other fasteners, and latch. When a crimping member is used, a crimping fixation can be carried out by, for example, inserting a long crimping member into the terminal opening parts 361 of the metal terminals 30a and 30b, the case opening parts 671 of the insulation cases 60_2 and 60_3, and the opening part of the installation portion 80 and pressurizing both ends of this crimping member under this state. The metal terminals 30a and 30b may be joined to the installation portion 80 by welding without using a fastener. The nut 92 may be built in the insulation cases 60_2 and 60_3. These are also the case with Second Embodiment to Fourth Embodiment.

In First Embodiment, the case opening parts 671 and the terminal opening parts 361 are not essential and may not be formed. In this case, the case side parts 670 and the terminal side parts 360 may mechanically be fixed to the installation portion 80. For example, the insulation cases 60_2 and 60_3 may be fixed to the installation portion 80 by sandwiching the case side parts 670, the terminal side parts 360, and the installation portion 80 with a sandwiching tool (e.g., clamp member). This is also the case with Second Embodiment.

In First Embodiment, the wide part 364 of the terminal-side fixation part 36 may be removed from the individual metal terminals 30a and 30b, and only the case-side fixation part 67 may be fixed to the installation portion 80 with the fastener 90. In this case, the capacitor chips 20a and 20b connected to the individual metal terminals 30a and 30b can electrically be connected to the installation portion 80 by joining the narrow part 362 to the installation portion 80 by soldering, welding, or the like.

In First Embodiment, the fixation manner of the electronic device 10 to the installation portion 80 is not limited to that of the illustrated example. That is, the fixation manner may appropriately be modified based on, for example, the shape of the installation portion 80. This is also the case with Second Embodiment to Fourth Embodiment.

In First Embodiment, the electronic device 10 may further be provided with a plurality of insulation cases 60_1 to 60_3. This is also the case with Second Embodiment to Fourth Embodiment.

In First Embodiment, the connection manner of the capacitor chips 20a and 20b with the metal terminals is not limited to that of the illustrated example and may appropriately be modified. For example, the capacitor chips 20a and 20b may be connected in parallel.

In First Embodiment, the shape of the lateral wall parts 68 may appropriately be modified, and the exterior shape of the lateral wall parts 68 when viewed from the Y-axis direction may be, for example, square or other polygon. This is also the case with Second Embodiment.

In Fourth Embodiment, the insulation cases 60_1 may be provided with the case-side fixation part 67 shown in FIG. 1A, and the case-side fixation part 67 may be disposed below the bottom part 720. In this case, the three insulation cases 60C_1 can be fixed to the installation portion 80 with the fasteners 90 by inserting the fasteners 90 into the case opening parts 671 of the case-side fixation parts 67 and the fixation opening parts 721 of the fixation parts 72.

DESCRIPTION OF THE REFERENCE NUMERICAL 10, 10A, 10B, 10C . . . electronic device
20a, 20b . . . capacitor chip
   21 . . . first end surface
   23 . . . second end surface
   22 . . . first terminal electrode
   24 . . . second terminal electrode
   26 . . . internal electrode layer
   28 . . . dielectric layer
30a, 30b, 30bA . . . first individual metal terminal, second individual metal terminal
   32 . . . inner electrode part
      320 . . . curved part
   34 . . . opening edge electrode part
   36 . . . terminal-side fixation part
      360 . . . terminal side part
         362 . . . narrow part
         364 . . . wide part
      361 . . . terminal opening part
40a, 40b . . . first common metal terminal, second common metal terminal
   42 . . . inner electrode part
      420 . . . curved part
   44 . . . opening edge electrode part
   46 . . . side electrode part
   48 . . . connection part
50a, 50b, 50c . . . first connection metal terminal, second connection metal terminal, third connection metal terminal
   52 . . . inner electrode part
      520 . . . curved part
   54 . . . connection part
   56 . . . side electrode part
60_1, 60_2, 60_3, 60_3', 60A_2, 60B_1, 60C_1 . . . insulation case
61_1, 61_2, 61_3, 61_3', 61A_2, 61B_1, 61C_1 . . . outer wall
   61a, 61b, 61c, 61d . . . outer surface
   62a, 62b . . . accommodation recess
   63 . . . bottom wall
   64, 64C . . . partition wall
   65 . . . communication groove
   66 . . . opening edge surface
      660, 660B . . . engagement groove
   67 . . . case-side fixation part
      670 . . . case side part
      671 . . . case opening part
   68 . . . lateral wall part
   69, 69C . . . connection part
      690, 690C . . . engagement protrusion
      691 . . . engagement recess
70 . . . fixation metal terminal
   71 . . . grip part
      710 . . . flat plate part
      711 . . . upper grip part
      712a, 712b . . . side grip part
      713a, 713b . . . side protrusion
   72 . . . fixation part
      720 . . . bottom part
      721 . . . fixation opening part
      722 . . . notch
   73 . . . connection part
80 . . . installation portion
81 . . . bus bar
90 . . . fastener
   91 . . . bolt
   92 . . . nut
   93 . . . washer

What is claimed is:

1. An electronic device comprising:
two chip components, each including an end surface and a terminal electrode on the end surface;
two cases, each including an accommodation recess respectively accommodating each chip component;
a plurality of conductive terminals connected to the terminal electrodes, the plurality of conductive terminals including a first conductive terminal and a second conductive terminal;
a connection part connecting the two cases; and
a fixation part configured to fix the plurality of cases to an installation portion, wherein:
the first conductive terminal includes a connecting terminal attached across the two cases, and the connecting terminal electrically connects the terminal electrodes of the two chip components to each other;
the second conductive terminal includes a fixation part terminal having a terminal side part extending toward an outside of an outer wall forming one of the accommodation recesses, and a terminal opening part is disposed in the terminal side part;

one of the cases includes a case side part formed outside an outer wall forming the accommodation recess, and a case opening part is formed in each case side part, and the terminal opening part and the case opening part are disposed to overlap each other to configure a part of the fixation part.

2. The electronic device according to claim 1, wherein the two cases are fixed to the installation portion with a fastener in the fixation part.

3. The electronic device according to claim 1, wherein the fixation part is disposed outside an outer wall forming one of the accommodation recesses.

4. The electronic device according to claim 1, wherein the installation portion is a conductor.

5. The electronic device according to claim 1, wherein an engagement groove configured to engage an end one of the plurality of conductive terminals is disposed along a periphery of the accommodation recess in each case.

* * * * *